US009265112B2

(12) United States Patent
Pederson

(10) Patent No.: US 9,265,112 B2
(45) Date of Patent: Feb. 16, 2016

(54) LED LIGHT CONTROL AND MANAGEMENT SYSTEM

(71) Applicant: Federal Law Enforcement Development Services, Inc., St. Cloud, MN (US)

(72) Inventor: John C. Pederson, Merritt Island, FL (US)

(73) Assignee: Federal Law Enforcement Development Services, Inc., St. Cloud, MN (US)

( * ) Notice: Subject to any disclaimer, the term of this patent is extended or adjusted under 35 U.S.C. 154(b) by 0 days.

(21) Appl. No.: 14/208,129

(22) Filed: Mar. 13, 2014

(65) Prior Publication Data

US 2014/0265920 A1    Sep. 18, 2014

Related U.S. Application Data

(60) Provisional application No. 61/778,672, filed on Mar. 13, 2013, provisional application No. 61/867,731, filed on Aug. 20, 2013, provisional application No. 61/927,638, filed on Jan. 15, 2014, provisional application No. 61/927,663, filed on Jan. 15, 2014.

(51) Int. Cl.
*H05B 37/02* (2006.01)
*H05B 33/08* (2006.01)

(52) U.S. Cl.
CPC ........ *H05B 33/0842* (2013.01); *H05B 33/0884* (2013.01); *H05B 37/0272* (2013.01)

(58) Field of Classification Search
CPC ...................................................... H05B 37/02

USPC .......... 315/246, 250, 291, 294, 307, 308, 312
See application file for complete search history.

(56) References Cited

U.S. PATENT DOCUMENTS

| 700,678 A | 5/1902 | Downie |
|---|---|---|
| 2,082,279 A | 6/1937 | Fore |
| 3,469,686 A | 9/1969 | Gutsche et al. |

(Continued)

FOREIGN PATENT DOCUMENTS

| AU | 2006201345 | 10/2007 |
|---|---|---|
| AU | 2007202909 | 2/2008 |

(Continued)

OTHER PUBLICATIONS

Akhavan et al., "High-Speed Power-Efficient Indoor Wireless Infrared Communication Using Code Combining—Part I," IEEE Trnsactions on Communications, vol. 50, No. 7, Jul. 2002, pp. 1098-1109.

(Continued)

*Primary Examiner* — Tung X Le
(74) *Attorney, Agent, or Firm* — Vidas, Arrett & Steinkraus

(57) ABSTRACT

An LED light and communication system is in communication with a broadband over power line communications system. The LED light and communication system includes at least one optical transceiver light fixture. The optical transceiver light fixture includes a plurality of light emitting diodes, at least one photodetector, and a processor. A facility management unit is in communication with the processor. The facility management unit is constructed and arranged to control the operation of the optical transceiver light fixture.

14 Claims, 18 Drawing Sheets

(56) References Cited

U.S. PATENT DOCUMENTS

| | | |
|---|---|---|
| 3,701,043 A | 10/1972 | Zuleeg et al. |
| 3,705,316 A | 12/1972 | Burrous et al. |
| 3,863,075 A | 1/1975 | Ironmonger et al. |
| 3,867,718 A | 2/1975 | Moe |
| 3,889,147 A | 6/1975 | Groves |
| 3,911,430 A | 10/1975 | Jankowski et al. |
| 4,149,111 A | 4/1979 | Coates, Jr. |
| 4,243,985 A | 1/1981 | Quayle |
| 4,254,453 A | 3/1981 | Mouyard |
| 4,271,408 A | 6/1981 | Teshima |
| 4,298,806 A | 11/1981 | Herold |
| 4,301,461 A | 11/1981 | Asano |
| 4,319,306 A | 3/1982 | Stanuch |
| 4,336,580 A | 6/1982 | Mouyard |
| 4,342,944 A | 8/1982 | SpringThorpe |
| 4,368,979 A | 1/1983 | Ruell |
| 4,390,931 A | 6/1983 | Gorick |
| 4,434,510 A | 2/1984 | Lemelson |
| 4,445,132 A | 4/1984 | Ichikawa |
| 4,556,862 A | 12/1985 | Meinershagen |
| 4,595,904 A | 6/1986 | Gosswiller |
| 4,598,198 A | 7/1986 | Fayfield |
| 4,614,866 A | 9/1986 | Liss |
| 4,615,131 A | 10/1986 | Wakatake |
| 4,616,225 A | 10/1986 | Woudenberg |
| 4,630,180 A | 12/1986 | Muraki |
| 4,630,183 A | 12/1986 | Fujita |
| 4,633,280 A | 12/1986 | Takasu |
| 4,654,629 A | 3/1987 | Bezos |
| 4,703,219 A | 10/1987 | Mesquida |
| 4,710,977 A | 12/1987 | Lemelson |
| 4,716,296 A | 12/1987 | Bussiere |
| 4,720,835 A | 1/1988 | Akiba |
| 4,724,312 A | 2/1988 | Snaper |
| 4,742,432 A | 5/1988 | Thillays |
| 4,799,135 A | 1/1989 | Inukai |
| 4,821,118 A | 4/1989 | Lafreniere |
| 4,821,338 A | 4/1989 | Naruse |
| 4,868,719 A | 9/1989 | Kouchi |
| 4,900,970 A | 2/1990 | Ando |
| 4,918,497 A | 4/1990 | Edmond |
| 4,928,084 A | 5/1990 | Reiser |
| 4,929,866 A | 5/1990 | Murata |
| 4,935,665 A | 6/1990 | Murata |
| 4,949,866 A | 8/1990 | Sanders |
| 4,954,822 A | 9/1990 | Borenstein |
| 4,965,644 A | 10/1990 | Kawabata |
| 4,966,862 A | 10/1990 | Edmond |
| 4,975,644 A | 12/1990 | Fox |
| 4,975,814 A | 12/1990 | Schairer |
| 4,990,970 A | 2/1991 | Fuller |
| 5,000,569 A | 3/1991 | Nylund |
| 5,027,168 A | 6/1991 | Edmond |
| 5,035,055 A | 7/1991 | McCullough |
| 5,038,406 A | 8/1991 | Titterton |
| 5,041,947 A | 8/1991 | Yuen |
| 5,045,767 A | 9/1991 | Wakatake |
| 5,050,055 A | 9/1991 | Lindsay |
| 5,057,828 A | 10/1991 | Rousseau |
| 5,060,303 A | 10/1991 | Wilmoth |
| 5,062,152 A | 10/1991 | Faulkner |
| 5,067,788 A | 11/1991 | Jannson |
| 5,091,828 A | 2/1992 | Jincks |
| D324,921 S | 3/1992 | Stanuch |
| 5,093,768 A | 3/1992 | Ohe |
| 5,097,397 A | 3/1992 | Stanuch |
| 5,097,612 A | 3/1992 | Williams |
| 5,101,326 A | 3/1992 | Roney |
| 5,122,943 A | 6/1992 | Pugh |
| 5,136,287 A | 8/1992 | Borenstein |
| 5,159,486 A | 10/1992 | Webb |
| 5,164,992 A | 11/1992 | Turk |
| 5,172,113 A | 12/1992 | Hamer |
| 5,182,647 A | 1/1993 | Chang |
| 5,187,547 A | 2/1993 | Niina |
| 5,193,201 A | 3/1993 | Tymes |
| 5,198,746 A | 3/1993 | Gyugyi |
| 5,198,756 A | 3/1993 | Jenkins |
| 5,220,235 A | 6/1993 | Wakimizu |
| 5,224,773 A | 7/1993 | Arimura |
| 5,233,204 A | 8/1993 | Fletcher |
| 5,235,498 A | 8/1993 | VanDulmen |
| 5,283,425 A | 2/1994 | Imamura |
| 5,291,196 A | 3/1994 | Defour |
| 5,296,840 A | 3/1994 | Gieffers |
| 5,298,738 A | 3/1994 | Gebert |
| 5,302,965 A | 4/1994 | Belcher |
| 5,313,187 A | 5/1994 | Choi |
| 5,321,593 A | 6/1994 | Moates |
| 5,357,123 A | 10/1994 | Sugawara |
| 5,357,409 A | 10/1994 | Glatt |
| 5,359,255 A | 10/1994 | Kawai |
| 5,359,669 A | 10/1994 | Shanley |
| 5,361,190 A | 11/1994 | Roberts |
| 5,362,971 A | 11/1994 | McMahon |
| 5,381,155 A | 1/1995 | Gerber |
| 5,400,140 A | 3/1995 | Johnston |
| 5,401,328 A | 3/1995 | Schmitz |
| 5,403,916 A | 4/1995 | Watanabe |
| 5,406,095 A | 4/1995 | Koyama |
| 5,410,328 A | 4/1995 | Yoksza |
| 5,410,453 A | 4/1995 | Ruskouski |
| 5,416,627 A | 5/1995 | Wilmoth |
| 5,419,065 A | 5/1995 | Lin |
| 5,420,444 A | 5/1995 | Sawase |
| 5,422,623 A | 6/1995 | Bader |
| 5,426,417 A | 6/1995 | Stanuch |
| 5,434,693 A | 7/1995 | Tanaka |
| 5,436,809 A | 7/1995 | Brassier |
| 5,450,301 A | 9/1995 | Waltz |
| 5,453,729 A | 9/1995 | Chu |
| 5,465,142 A | 11/1995 | Krumes |
| 5,471,371 A | 11/1995 | Koppolu |
| 5,475,241 A | 12/1995 | Harrah |
| 5,482,896 A | 1/1996 | Tang |
| 5,490,048 A | 2/1996 | Brassier |
| 5,490,049 A | 2/1996 | Montalan |
| 5,491,350 A | 2/1996 | Unno |
| 5,498,883 A | 3/1996 | Lebby |
| 5,514,627 A | 5/1996 | Lowery |
| 5,516,727 A | 5/1996 | Broom |
| 5,519,720 A | 5/1996 | Hirano |
| 5,526,237 A | 6/1996 | Davenport |
| 5,528,474 A | 6/1996 | Roney |
| 5,532,472 A | 7/1996 | Furuta |
| 5,546,219 A | 8/1996 | Iida |
| 5,546,496 A | 8/1996 | Kimoto |
| 5,552,780 A | 9/1996 | Knockeart |
| 5,557,257 A | 9/1996 | Gieffers |
| 5,567,036 A | 10/1996 | Theobald |
| 5,568,406 A | 10/1996 | Gerber |
| 5,569,939 A | 10/1996 | Choi |
| 5,575,459 A | 11/1996 | Anderson |
| 5,580,156 A | 12/1996 | Suzuki |
| 5,585,783 A | 12/1996 | Hall |
| 5,593,223 A | 1/1997 | Koizumi |
| 5,593,459 A | 1/1997 | Gamblin |
| 5,594,415 A | 1/1997 | Ishikawa |
| 5,598,290 A | 1/1997 | Tanaka |
| 5,604,480 A | 2/1997 | Lamparter |
| 5,606,444 A | 2/1997 | Johnson |
| 5,607,788 A | 3/1997 | Tomazic |
| 5,612,201 A | 3/1997 | DePlaen |
| 5,612,231 A | 3/1997 | Holm |
| 5,625,201 A | 4/1997 | Holm |
| 5,627,851 A | 5/1997 | Takahashi |
| 5,631,474 A | 5/1997 | Saitoh |
| 5,632,551 A | 5/1997 | Roney |
| 5,633,629 A | 5/1997 | Hochstein |
| 5,634,287 A | 6/1997 | Lamparter |
| 5,634,357 A | 6/1997 | Nutter |
| 5,634,711 A | 6/1997 | Kennedy |
| 5,635,902 A | 6/1997 | Hochstein |
| 5,635,981 A | 6/1997 | Ribacoff |

(56) References Cited

U.S. PATENT DOCUMENTS

| | | |
|---|---|---|
| 5,636,916 A | 6/1997 | Sokolowski |
| 5,643,357 A | 7/1997 | Breton |
| 5,644,291 A | 7/1997 | Jozwik |
| 5,656,829 A | 8/1997 | Sakaguchi |
| 5,660,461 A | 8/1997 | Ignatius |
| 5,661,645 A | 8/1997 | Hochstein |
| 5,661,742 A | 8/1997 | Huang |
| 5,664,448 A | 9/1997 | Swan |
| 5,674,000 A | 10/1997 | Kalley |
| 5,694,112 A | 12/1997 | VannRox |
| 5,696,500 A | 12/1997 | Diem |
| 5,697,175 A | 12/1997 | Schwartz |
| 5,705,047 A | 1/1998 | Lee |
| 5,707,891 A | 1/1998 | Izumi |
| 5,708,428 A | 1/1998 | Phillips |
| 5,722,760 A | 3/1998 | Chien |
| 5,726,535 A | 3/1998 | Yan |
| 5,726,786 A | 3/1998 | Heflinger |
| 5,734,337 A | 3/1998 | Kupersmit |
| 5,734,343 A | 3/1998 | Urbish |
| 5,736,925 A | 4/1998 | Knauff |
| 5,739,552 A | 4/1998 | Kimura |
| 5,739,592 A | 4/1998 | Rigsby |
| 5,758,947 A | 6/1998 | Glatt |
| 5,760,531 A | 6/1998 | Pederson |
| 5,781,105 A | 7/1998 | Bitar |
| 5,785,418 A | 7/1998 | Hochstein |
| 5,786,918 A | 7/1998 | Suzuki |
| 5,789,768 A | 8/1998 | Lee |
| 5,793,062 A | 8/1998 | Kish, Jr. |
| 5,796,376 A | 8/1998 | Banks |
| 5,804,822 A | 9/1998 | Brass |
| 5,805,081 A | 9/1998 | Fikacek |
| 5,805,209 A | 9/1998 | Yuge |
| 5,806,965 A | 9/1998 | Deese |
| 5,808,592 A | 9/1998 | Mizutani |
| 5,809,161 A | 9/1998 | Auty |
| 5,809,681 A | 9/1998 | Miyamoto |
| 5,810,833 A | 9/1998 | Brady |
| 5,818,421 A | 10/1998 | Ogino |
| 5,826,965 A | 10/1998 | Lyons |
| 5,828,055 A | 10/1998 | Jebens |
| 5,831,155 A | 11/1998 | Hewitt |
| 5,838,024 A | 11/1998 | Masuda |
| 5,838,116 A | 11/1998 | Katyl |
| 5,838,247 A | 11/1998 | Bladowski |
| 5,838,259 A | 11/1998 | Tonkin |
| 5,848,837 A | 12/1998 | Gustafson |
| 5,860,135 A | 1/1999 | Sugita |
| 5,872,646 A | 2/1999 | Alderman |
| 5,875,261 A | 2/1999 | Fitzpatrick |
| 5,884,997 A | 3/1999 | Stanuch |
| 5,898,381 A | 4/1999 | Gartner |
| 5,900,850 A | 5/1999 | Bailey |
| 5,917,637 A | 6/1999 | Ishikawa |
| 5,929,788 A | 7/1999 | Vukosic |
| 5,931,562 A | 8/1999 | Arato |
| 5,931,570 A | 8/1999 | Yamuro |
| 5,932,860 A | 8/1999 | Plesko |
| 5,934,694 A | 8/1999 | Schugt |
| 5,936,417 A | 8/1999 | Nagata |
| 5,939,996 A | 8/1999 | Kniveton |
| 5,948,038 A | 9/1999 | Daly |
| 5,959,752 A | 9/1999 | Ota |
| 5,960,135 A | 9/1999 | Ozawa |
| 5,965,879 A | 10/1999 | Leviton |
| 5,966,073 A | 10/1999 | Walton |
| 5,975,714 A | 11/1999 | Vetorino |
| 5,990,802 A | 11/1999 | Maskeny |
| 5,991,085 A | 11/1999 | Rallison |
| 6,009,650 A | 1/2000 | Lamparter |
| 6,014,237 A | 1/2000 | Abeles |
| 6,018,899 A | 2/2000 | Hanitz |
| 6,028,694 A | 2/2000 | Schmidt |
| 6,035,053 A | 3/2000 | Yoshioka |
| 6,035,055 A | 3/2000 | Wang |
| 6,035,074 A | 3/2000 | Fujimoto |
| 6,067,010 A | 5/2000 | Wang |
| 6,067,011 A | 5/2000 | Leslie |
| 6,067,018 A | 5/2000 | Skelton |
| 6,072,893 A | 6/2000 | Luo |
| 6,081,206 A | 6/2000 | Kielland |
| 6,081,304 A | 6/2000 | Kuriyama |
| 6,086,229 A | 7/2000 | Pastrick |
| 6,091,025 A | 7/2000 | Cotter |
| 6,094,148 A | 7/2000 | Henry |
| 6,095,661 A | 8/2000 | Lebens |
| 6,095,663 A | 8/2000 | Pond |
| 6,102,696 A | 8/2000 | Osterwalder |
| 6,106,137 A | 8/2000 | Adams |
| 6,111,671 A | 8/2000 | Bahuguna |
| 6,118,388 A | 9/2000 | Morrison |
| 6,121,898 A | 9/2000 | Moetteli |
| 6,126,087 A | 10/2000 | Hedger |
| 6,159,005 A | 12/2000 | Herold |
| 6,166,496 A | 12/2000 | Lys |
| 6,177,678 B1 | 1/2001 | Brass |
| 6,183,100 B1 | 2/2001 | Suckow |
| 6,188,738 B1 | 2/2001 | Sakamoto |
| 6,243,492 B1 | 6/2001 | Kamei |
| 6,249,340 B1 | 6/2001 | Jung |
| 6,268,788 B1 | 7/2001 | Gray |
| 6,271,814 B1 | 8/2001 | Kaoh |
| 6,271,815 B1 | 8/2001 | Yang |
| 6,271,913 B1 | 8/2001 | Jung |
| 6,292,575 B1 | 9/2001 | Bortolussi |
| 6,293,904 B1 | 9/2001 | Blazey |
| 6,318,886 B1 | 11/2001 | Stopa |
| 6,352,358 B1 | 3/2002 | Lieberman |
| 6,367,949 B1 | 4/2002 | Pederson |
| 6,369,849 B1 | 4/2002 | Rzyski |
| 6,377,558 B1 | 4/2002 | Dent |
| 6,380,865 B1 | 4/2002 | Pederson |
| 6,389,115 B1 | 5/2002 | Swistock |
| 6,389,155 B2 | 5/2002 | Funayama |
| 6,396,954 B1 | 5/2002 | Kondo |
| 6,400,828 B2 | 6/2002 | Covell |
| 6,411,022 B1 | 6/2002 | Machida |
| 6,424,269 B1 | 7/2002 | Pederson |
| 6,426,599 B1 | 7/2002 | Leeb |
| 6,461,008 B1 | 10/2002 | Pederson |
| 6,462,669 B1 | 10/2002 | Pederson |
| 6,469,631 B1 | 10/2002 | Pederson |
| 6,472,996 B1 | 10/2002 | Pederson |
| 6,476,726 B1 | 11/2002 | Pederson |
| 6,504,487 B1 | 1/2003 | Pederson |
| 6,532,212 B1 | 3/2003 | Soloway |
| 6,547,410 B1 | 4/2003 | Pederson |
| 6,548,967 B1 | 4/2003 | Dowling |
| 6,590,343 B2 | 7/2003 | Pederson |
| 6,590,502 B1 | 7/2003 | Pederson |
| 6,600,274 B1 | 7/2003 | Hughes |
| 6,600,899 B1 | 7/2003 | Radomsky |
| 6,614,359 B2 | 9/2003 | Pederson |
| 6,623,151 B2 | 9/2003 | Pederson |
| 6,683,590 B1 | 1/2004 | Pang |
| 6,690,294 B1 | 2/2004 | Zierden |
| 6,693,551 B2 | 2/2004 | Pederson |
| 6,705,745 B1 | 3/2004 | Pederson |
| 6,707,389 B2 | 3/2004 | Pederson |
| 6,788,217 B2 | 9/2004 | Pederson |
| 6,814,459 B2 | 11/2004 | Pederson |
| 6,819,654 B2 | 11/2004 | Soloway |
| 6,819,677 B1 | 11/2004 | Nouzovsky |
| 6,822,578 B2 | 11/2004 | Pederson |
| 6,844,824 B2 | 1/2005 | Vukosic |
| 6,879,263 B2 | 4/2005 | Pederson |
| 6,892,942 B1 | 5/2005 | Widl |
| 7,006,768 B1 | 2/2006 | Franklin |
| 7,023,469 B1 | 4/2006 | Olson |
| 7,046,160 B2 | 5/2006 | Pederson |
| 7,102,665 B1 | 9/2006 | Chandler |
| 7,103,614 B1 | 9/2006 | Kucik |
| 7,183,895 B2 | 2/2007 | Bazakos |

(56) References Cited

U.S. PATENT DOCUMENTS

| | | | |
|---|---|---|---|
| 7,230,884 B2 | 6/2007 | Shemesh | |
| 7,289,731 B2 | 10/2007 | Thinguldstad | |
| 7,309,965 B2 | 12/2007 | Dowling | |
| 7,321,757 B2 | 1/2008 | Yamashita | |
| 7,323,991 B1 | 1/2008 | Eckert | |
| 7,352,972 B2 | 4/2008 | Franklin | |
| 7,439,847 B2 | 10/2008 | Pederson | |
| 7,439,874 B2 | 10/2008 | Sotiriou | |
| 7,529,488 B2 | 5/2009 | Burdick | |
| 7,548,698 B2 | 6/2009 | Yamamoto | |
| 7,557,521 B2 | 7/2009 | Lys | |
| 7,583,901 B2 | 9/2009 | Nakagawa | |
| 7,689,130 B2 | 3/2010 | Ashdown | |
| 7,912,377 B2 | 3/2011 | Koga | |
| 7,940,191 B2 * | 5/2011 | Hierzer | F21S 2/00 340/335 |
| 8,126,554 B2 | 2/2012 | Kane | |
| 8,175,799 B1 | 5/2012 | Woehler | |
| 8,188,878 B2 | 5/2012 | Pederson | |
| 8,188,879 B2 | 5/2012 | Pederson | |
| 8,207,821 B2 | 6/2012 | Roberge | |
| 8,421,588 B1 * | 4/2013 | Ross et al. | 340/5.1 |
| 8,538,692 B2 | 9/2013 | Wurman | |
| 8,571,411 B2 | 10/2013 | Pederson | |
| 8,593,299 B2 | 11/2013 | Pederson | |
| 8,687,965 B2 | 4/2014 | Pederson | |
| 8,729,833 B2 * | 5/2014 | Chemel et al. | 315/308 |
| 8,744,267 B2 | 6/2014 | Pederson | |
| 8,886,045 B2 | 11/2014 | Pederson | |
| 8,890,773 B1 | 11/2014 | Pederson | |
| 8,902,076 B2 | 12/2014 | Pederson | |
| 2002/0109892 A1 | 8/2002 | Seto | |
| 2002/0168958 A1 | 11/2002 | Ford | |
| 2003/0025608 A1 | 2/2003 | Pederson | |
| 2003/0118216 A1 | 6/2003 | Goldberg | |
| 2003/0156037 A1 | 8/2003 | Pederson | |
| 2003/0169164 A1 | 9/2003 | Lau | |
| 2003/0185340 A1 | 10/2003 | Frantz | |
| 2003/0212996 A1 | 11/2003 | Wolzien | |
| 2003/0222587 A1 | 12/2003 | Dowling | |
| 2004/0028349 A1 | 2/2004 | Nagasaka | |
| 2004/0044709 A1 | 3/2004 | Cabrera | |
| 2004/0101312 A1 | 5/2004 | Cabrera | |
| 2004/0151344 A1 | 8/2004 | Farmer | |
| 2004/0153229 A1 | 8/2004 | Gokturk | |
| 2004/0208599 A1 | 10/2004 | Swartz | |
| 2005/0002673 A1 | 1/2005 | Okano | |
| 2005/0005794 A1 | 1/2005 | Inukai | |
| 2005/0057941 A1 | 3/2005 | Pederson | |
| 2005/0111700 A1 | 5/2005 | OBoyle | |
| 2005/0169643 A1 | 8/2005 | Franklin | |
| 2005/0231128 A1 | 10/2005 | Franklin | |
| 2006/0039698 A1 | 2/2006 | Pautler | |
| 2006/0056855 A1 | 3/2006 | Nakagawa | |
| 2006/0132382 A1 | 6/2006 | Jannard | |
| 2006/0149813 A1 | 7/2006 | Janik | |
| 2006/0192672 A1 | 8/2006 | Gidge | |
| 2006/0193634 A1 | 8/2006 | Wang | |
| 2006/0213731 A1 | 9/2006 | Lesesky | |
| 2006/0238368 A1 | 10/2006 | Pederson | |
| 2006/0275040 A1 | 12/2006 | Franklin | |
| 2007/0104239 A1 | 5/2007 | Koga | |
| 2007/0110446 A1 | 5/2007 | Hong | |
| 2007/0145915 A1 | 6/2007 | Roberge | |
| 2007/0147843 A1 | 6/2007 | Fujiwara | |
| 2007/0160373 A1 | 7/2007 | Biegelsen | |
| 2007/0165244 A1 | 7/2007 | Yukhin | |
| 2007/0195263 A1 | 8/2007 | Shimizu | |
| 2007/0269219 A1 | 11/2007 | Teller | |
| 2007/0294029 A1 | 12/2007 | DAndrea | |
| 2008/0044188 A1 | 2/2008 | Kagawa | |
| 2008/0063404 A1 | 3/2008 | Broyde | |
| 2008/0138077 A1 | 6/2008 | Stretton | |
| 2008/0154101 A1 | 6/2008 | Jain | |
| 2008/0170536 A1 | 7/2008 | Marshack | |
| 2008/0227463 A1 | 9/2008 | Hizume | |
| 2008/0292320 A1 | 11/2008 | Pederson | |
| 2009/0002265 A1 | 1/2009 | Kitaoka | |
| 2009/0102396 A1 * | 4/2009 | Petrucci et al. | 315/294 |
| 2009/0129782 A1 | 5/2009 | Pederson | |
| 2009/0157545 A1 | 6/2009 | Mobley | |
| 2009/0262760 A1 | 10/2009 | Krupkin | |
| 2009/0315481 A1 * | 12/2009 | Zhao | 315/297 |
| 2009/0315485 A1 * | 12/2009 | Verfuerth | H05B 37/0272 315/320 |
| 2010/0060194 A1 * | 3/2010 | Furry | H05B 33/0803 315/294 |
| 2010/0111538 A1 | 5/2010 | Arita | |
| 2010/0209105 A1 | 8/2010 | Shin | |
| 2011/0006898 A1 | 1/2011 | Kruest | |
| 2012/0202520 A1 | 8/2012 | George | |
| 2012/0230696 A1 | 9/2012 | Pederson | |
| 2013/0221848 A1 * | 8/2013 | Miesak | 315/112 |
| 2014/0153923 A1 | 6/2014 | Casaccia | |

FOREIGN PATENT DOCUMENTS

| | | |
|---|---|---|
| CA | 2164920 | 6/1996 |
| DE | 4304216 | 8/1994 |
| DE | 19502735 | 8/1996 |
| DE | 19548639 | 6/1997 |
| DE | 19721673 | 11/1997 |
| DE | 29712281 | 1/1998 |
| EP | 0326668 | 8/1989 |
| EP | 0468822 | 1/1992 |
| EP | 0531184 | 3/1993 |
| EP | 0531185 | 3/1993 |
| EP | 0596782 | 5/1994 |
| EP | 0633163 | 1/1995 |
| EP | 0688696 | 12/1995 |
| EP | 0709818 | 5/1996 |
| EP | 0793403 | 9/1997 |
| EP | 0887783 | 12/1998 |
| EP | 0890894 | 1/1999 |
| EP | 0896898 | 2/1999 |
| EP | 0967590 | 12/1999 |
| EP | 1043189 | 10/2000 |
| EP | 1205763 | 5/2002 |
| EP | 1564914 | 8/2005 |
| FR | 2658024 | 8/1991 |
| FR | 2680861 | 3/1993 |
| FR | 2707222 | 1/1995 |
| FR | 2800500 | 5/2001 |
| GB | 1241369 | 8/1971 |
| GB | 2069257 | 8/1981 |
| GB | 2139340 | 11/1984 |
| GB | 2175428 | 11/1986 |
| GB | 2240650 | 2/1990 |
| GB | 2111270 | 6/1993 |
| GB | 2272791 | 5/1994 |
| GB | 2292450 | 2/1996 |
| GB | 2311401 | 9/1997 |
| GB | 2323618 | 9/1998 |
| GB | 2330679 | 4/1999 |
| GB | 2359179 | 8/2001 |
| GB | 2359180 | 8/2001 |
| JP | 60143150 | 7/1985 |
| JP | S63153166 | 6/1988 |
| JP | 6333403 | 12/1994 |
| JP | 06333403 | 12/1994 |
| JP | 08002341 | 1/1996 |
| JP | 8002341 | 1/1996 |
| JP | 10098778 | 4/1998 |
| WO | 9750070 | 12/1997 |
| WO | 9935634 | 7/1999 |
| WO | 9942985 | 8/1999 |
| WO | 9949435 | 9/1999 |
| WO | 9949446 | 9/1999 |
| WO | 0074975 | 12/2000 |
| WO | 0101675 | 1/2001 |
| WO | 0110674 | 2/2001 |
| WO | 0110675 | 2/2001 |
| WO | 0110676 | 2/2001 |

(56) References Cited

FOREIGN PATENT DOCUMENTS

| WO | 0225842 | 3/2002 |
| WO | 02073836 | 9/2002 |
| WO | 2007003037 | 11/2007 |

OTHER PUBLICATIONS

Djahani et al., "Analysis of Infrared Wireless Links Employing Multibeam Transmitters and Imaging Diversity Receivers," IEEE Transactions on Communications, vol. 48, No. 12, Dec. 2000, pp. 2077-2088.

Hawaiian Electric Company, Inc.: Powerlines—Energy Efficiency Takes-off at Honolulu International Airport, Spring 2008, pp. 1-13.

Jeffrey B. Carruthers, "Wireless Infrared Communications," Wiley Encyclopedia of Telecommunications, 2002.

Kahn et al., "Wireless Infrared Communications," Proceedings of the IEEE, vol. 85, No. 2, Feb. 1997, pp. 265-298.

Komine T. et al., "Integrated System of White LED Visible-Light Communicaiton and Power-Line Communication," 20020915; 20020915-20020918, vol. 4, Sep. 15, 2002, pp. 1762-1766.

Pacific Northwest National Laboratory: Demonstration Assement of Light-Emitting Diode (LED) Parking Lot Lighting, Phase 1, Jun. 2010, pp. 1-37.

T. Komine and M. Nakagawa, Integrated System of White LED Visible-Light Communication and Power-Line Communication Integrated System of White LED Visible-Light Communication and Power-Line Communication, Toshihiko Komine, Student Member, IEEE and Masao Nakagawa, Member, IEEE Date 1, Feb. 2003 pp. 71-79.

Van Wicklen, Garrett L.: Using LED Lights Can Reduce Your Electricity Costs, Dec. 2005, Cooperative Extension Service, Applied Poultry Engineering News, vol. 3, No. 1, pp. 1-4.

\* cited by examiner

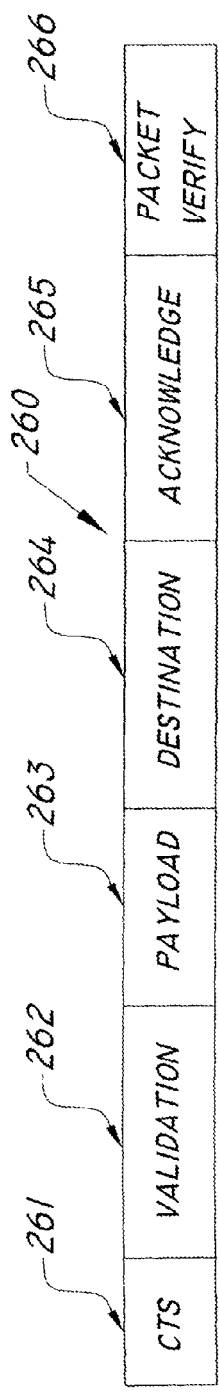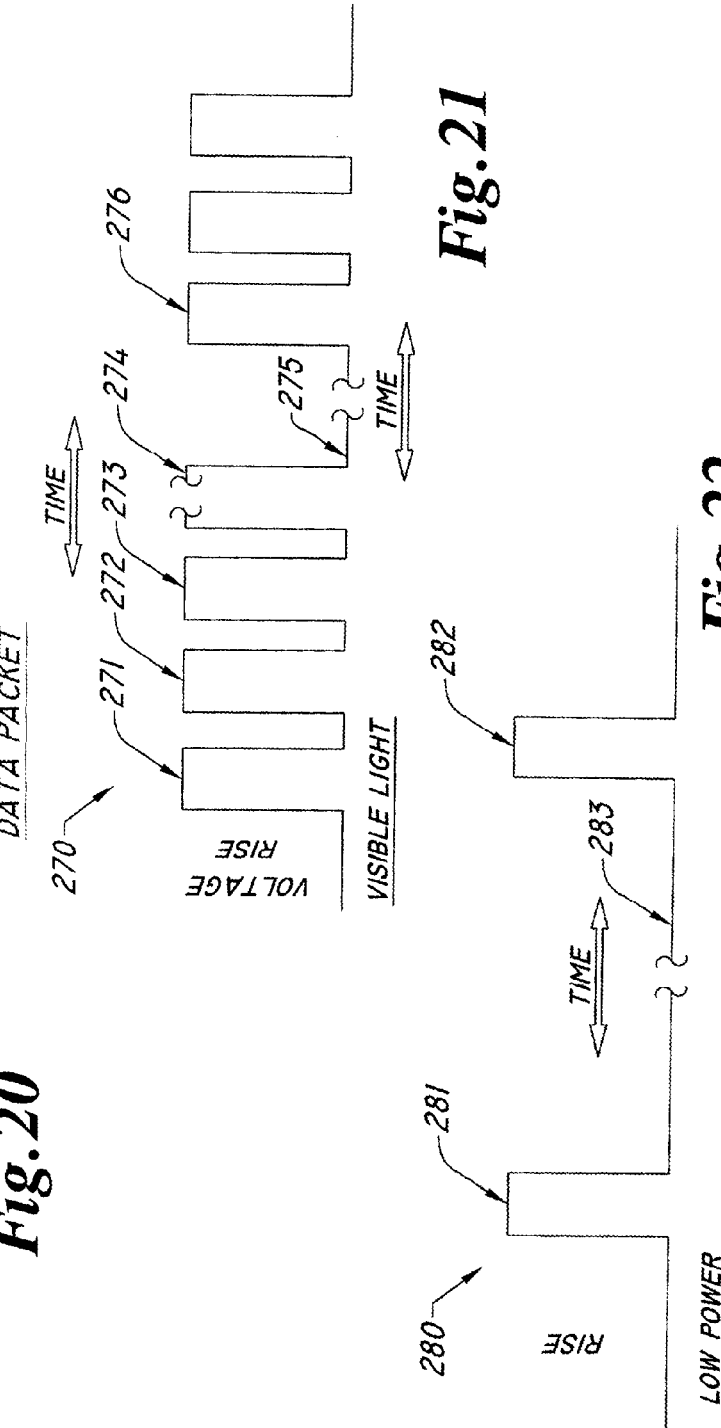

LED LIGHT CONTROL AND MANAGEMENT SYSTEM

CROSS-REFERENCE TO RELATED APPLICATIONS

This application claims priority to Provisional Application No. 61/778,672, filed Mar. 13, 2013, the disclosure of which is expressly incorporated herein by reference.

This application also claims priority to Provisional Application No. 61/867,731, filed Aug. 20, 2013, the disclosure of which is expressly incorporated herein by reference.

This application also claims priority to Provisional Application No. 61/927,638, filed Jan. 15, 2014, the disclosure of which is expressly incorporated herein by reference.

This application also claims priority to Provisional Application No. 61/927,663, filed Jan. 15, 2014, the disclosure of which is expressly incorporated herein by reference.

STATEMENT REGARDING FEDERALLY SPONSORED RESEARCH

Not Applicable

FIELD OF THE INVENTION

In some embodiments, the present invention is generally directed to light emitting diodes (LEDs) and applications thereof. In particular, some embodiments of the present invention are directed to using LEDs and power line communication technology to provide internet access and communication capability to residential and commercial clientele.

BACKGROUND OF THE INVENTION

Light sources used for communication are extremely secure due to the fact that they are focused within a narrow beam, requiring placement of equipment within the beam itself for interception. Also, because the visible spectrum is not regulated by the FCC, light sources can be used for communications purposes without the need of a license. Light sources are also not susceptible to interference nor do they produce noise that can interfere with other devices.

Light emitting diodes (LEDs) may be used as light sources for data transmission, as described in U.S. Pat. Nos. 6,879,263 and 7,046,160, the entire contents of each being expressly incorporated herein by reference. LED technology provides a practical opportunity to combine lighting and communication. This combination of lighting and communication allows ubiquitous light sources such as street lights, home lighting, and office building lighting, for example, to be converted to, or supplemented with, LED technology to provide for communications while simultaneously producing light for illumination purposes.

Regarding office buildings, building management is a complex science which incorporates and governs all facets of human, mechanical and structural systems associated with buildings. As a result of the complexity, most commercial buildings are managed by commercial property management companies with great expertise. Both at the time of construction and throughout the life-cycle of a building, the interrelationships between people and the mechanical and structural systems are most desirably evaluated.

One very important area associated with building management is lighting or illumination. While often perceived as a simple task of providing lights, this seemingly simple task has much research and science behind a well-designed lighting system. This is because safety, productivity and general well-being of occupants depend heavily on proper lighting.

Many factors need to be considered at the time of construction or remodeling to facilitate proper lighting design. Intended usage of a space is important in illumination design considerations, since this will dictate necessary illumination levels, times and duration of use, and anticipated cycling of the illumination. The use of appropriate switches helps to reduce the energy required for a building to function with occupants, and simultaneously increases the life of many illumination components, such as light sources (light bulbs and equivalents thereto) since the light sources are only required intermittently.

Nearly all public buildings rely on a great many lamps positioned throughout the interior of the building, such as along hall corridors and in each room, and also about the exterior. These lights have historically been activated manually.

Another very important consideration associated with building management is energy management. The concern for energy management is driven by the expense associated with energy consumed over the life of a building. Energy management is quite challenging to design into a building, because many human variables come into play within different areas within a building structure. Different occupants will have different preferences and habits. Some occupants may regularly forget to turn off lights when a space is no longer being occupied, thereby wasting electricity and diminishing the useful life of the light bulbs. In another instance, one occupant may require full illumination for that occupant to operate efficiently or safely within a space, while a second occupant might only require a small amount or local area of illumination. Further complicating the matter of energy management is the fact that many commercial establishments may have rates based upon peak usage. A business with a large number of lights that are controlled with a common switch may have peak demands which are large relative as compared to total consumption of power, simply due to the relatively large amount of power that will rush into the circuit. Breaking the circuit into several switches may not adequately address inrush current, since a user may switch more than one switch at a time, such as by sliding a hand across several switches at once. Additionally, during momentary or short-term power outages, the start-up of electrical devices by the power company is known to cause many problems, sometimes harming either customer equipment or power company devices. Control over inrush current is therefore very desirable, and not economically viable in the prior art.

Energy management also includes consideration for differences in temperature preferred by different occupants or for different activities. For exemplary purposes, an occupant of a first office space within a building may prefer a temperature close to 68 degrees Fahrenheit, while a different occupant in a second office space may prefer a temperature close to 78 degrees Fahrenheit. The first and second office spaces may even be the same office space, just at different times of day. For exemplary purposes, an employee working in a mail room from 8 a.m. until 4 p.m. may be replaced by a different mail room employee who works from 4 p.m. until 12 a.m. Heating, Ventilation, and Air Conditioning (HVAC) demand or need is dependent not only upon the desired temperature for a particular occupant, but also upon the number of occupants within a relatively limited space With careful facility design, considerable electrical and thermal energy can be saved. Proper management of electrical resources affects every industry, including both tenants and building owners. In many instances facility design has been limited to selection of very simple or basic switches, and thermostats, and particular lights, all fixed at the time of design, construction or installation.

Yet another very important area associated with building management is guidance control and indication, which impacts building security, as well as building convenience and efficiency for occupants. In buildings having many alternative hallways or paths, such as are commonly found in hospitals and other large public facilities, directions are often clumsy and difficult for visitors or emergency personnel to follow. Old-fashioned directories may be hard to locate or decipher, especially for speakers of a foreign language or for persons with little or no time, again such as emergency personnel. Consequently, some buildings provide color stripes along walls that serve as color coding to guide visitors to various areas within the building. Unfortunately, the number of color stripes that may be patterned is quite limited, and the expense and defacing of appearance associated therewith is undesirable. Furthermore, such striping does not completely alleviate confusion, and the color stripes can only serve as general guides to commonly visited areas.

Modern communications systems interconnect various electrical, electro-mechanical, or electrically controlled apparatuses. These connections may be referred to as connections between client devices and host devices. For the purposes of the present disclosure, host devices are simply parts of the network that serve to host or enable communications between various client devices. Generally speaking, host devices are apparatuses that are dedicated to providing or enabling communications. Peer-to-peer networks exist wherein, at any given moment, a device may be either client or host. In such a network, when the device is providing data, information or services, it may be referred to as the host, and when the same device is requesting information, it may be referred to as the client.

The host may provide connection to a Local Area Network (LAN), sometimes referred to as an Intranet, owing to the common use of such a network entirely within an office space, building, or business. The host may additionally or alternatively provide connection to a Wide Area Network (WAN), commonly describing a network coupling between widely separated physical locations which are connected together through any suitable connection, including for exemplary purposes but not solely limited thereto such means as fiber optic links, T1 lines, Radio Frequency (RF) links including cellular telecommunications links, satellite connections, DSL connections, or even Internet connections. Generally, where more public means such as the Internet are used, secured access will commonly separate the WAN from general Internet traffic. The host may further provide access to the Internet. Exemplary host apparatuses include modems, routers, switches, or other devices that may enable or secure communications with clients.

Client devices may commonly include computing devices of all sorts, ranging from hand-held devices such as Personal Digital Assistants (PDAs) to massive mainframe computers, and including Personal Computers (PCs). However, over time many more devices have been enabled for connection to network hosts, including for exemplary purposes printers, network storage devices, cameras, other security and safety devices, appliances, HVAC systems, manufacturing machinery, and so forth. Essentially, any device which incorporates or can be made to incorporate sufficient electronic circuitry may be so linked as a client to a host.

Most current communications systems rely upon wires and/or radio waves to link clients and hosts. Existing client devices are frequently designed to connect to host network access points through wired connections, fiber optic connections, or as wireless connections, such as wireless routers or wireless access points.

In the case of wireless routers a radio signal replaces the physical communications channel between clients and hosts with a radio channel. This advantageously eliminates the wire tether between client and host. Instead, client devices in a wireless system try through various broadcasts and signal receptions to find an access point that will have adequate transmission and reception, generally within a certain signal range which may range from a few meters to as many as several tens of meters. Depending upon the communications channel, a variety of client connection devices are utilized such as PCMCIA or PC cards, serial ports, parallel ports, SIMM cards, USB connectors, Ethernet cards or connectors, firewire interfaces, Bluetooth compatible devices, infrared/IrDA devices, and other known or similar components. The security of these prior art wireless devices can be compromised in that they are vulnerable to unauthorized access or interception, and the interception may be from a significant distance, extending often well beyond physical building and property boundaries.

More buildings are incorporating wireless networks where the networks are intended to reduce the need for wiring alterations and additions practiced heretofore. However, these wireless networks are not contained within the walls of a building, and so they are subject to a number of limitations. One of these is the lack of specific localization of a signal and device. For exemplary purposes, even a weak Radio-Frequency (RF) transceiver, in order to communicate reliably with all devices within a room, will have a signal pattern that will undoubtedly cross into adjacent rooms. If only one room or space in a building is to be covered, this signal overlap is without consequence. However, when many rooms are to be covered by different transceivers, signal overlap between transceivers requires more complex communications systems, including incorporating techniques such as access control and device selection based upon identification. Since the radio signal is invisible, detection of radiant pattern and signal strength are difficult and require special instruments. Further, detection of interference is quite difficult. Finally, such systems are subject to outside tapping and corruption, since containment of the signal is practically impossible for most buildings.

In addition to data communications, buildings and other spaces may also have a number of additional important needs including, for exemplary purposes though not limited thereto, illumination, fire and smoke detection, temperature control, and public address. With regard to illumination, buildings and other spaces are designed with a particular number and placement of particular types of light bulbs. Most designers incorporate incandescent or fluorescent bulbs to provide a desirable illumination within a space. The number and placement of these bulbs is most commonly based upon the intended use of the space.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

All U.S. patents and applications and all other published documents mentioned anywhere in this application are incorporated herein by reference in their entirety.

Without limiting the scope of the invention, a brief summary of some of the claimed embodiments of the invention is set forth below. Additional details of the summarized embodiments of the invention and/or additional embodiments of the invention may be found in the Detailed Description of the Invention below. A brief abstract of the technical disclosure in the specification is provided for the purposes of complying with 37 C.F.R. §1.72.

GENERAL DESCRIPTION OF THE INVENTION

A plurality of light supports or solitary light sources may be electrically coupled in either a parallel or series manner to a controller. The controller is also preferably in electrical communication with the power supply and the LED's, to regulate or modulate the light intensity for the LED light sources. The individual LED's and/or arrays of LED's may be used for transmission of communication packets formed of light signals.

The controller for the LED light support may generate and/or recognize pulsed light signals used to communicate information. The LED light system may also include a receptor coupled to the controller, where the receptor is constructed and arranged for receipt of pulsed LED light signals for conversion to digital information, and for transfer of the digital information to the controller for analysis and interpretation. The controller may then issue a light signal or other communication signal to communicate the content of received information transmitted via a pulsed LED light carrier.

According to the invention, there is provided an illumination apparatus that is capable of illuminating a space and simultaneously capable of communicating through visible light directly with a number of adjunct devices. In addition to human communications, communications with adjunct devices may effect various convenience, security, energy management and related functions. The illumination apparatus further enables control over intensity, color temperature, and even color without requiring any physical change of the illumination apparatus.

Visible Light Embedded Communication, or VLEC, as taught herein is a secure last mile solution to many diverse communications needs. Last mile refers to the final portion of any communications system, and it is commonly known that the last mile normally demands the vast majority of expense and difficulty in establishing and maintaining a system. Light Emitting Diodes, or LEDs, provide with other apparatus a communications channel while simultaneously affording flexible illumination within a space or building. Using LEDs to provide visible lighting and to embed communications therein enables the present invention to improve security and provide higher capacity as compared to lighting systems as known. The LED link is untethered and enables a communication link with nomadic devices. The link is untethered in that the user is independent of any one host, and may get the same information at other optical hosts.

In a Broadband Power Line BPL system, data is carried as a signal through existing mediums like fiber-optic cable, radio waves, conventional telephone lines, or through the present invention Visible Light Embedded Communications (VLEC) around high-voltage lines. It is then injected into the power grid downstream, onto medium or low voltage wires to businesses and homes. Through advanced electronic equipment, the signal makes its way to Industrial parks and neighborhoods. Customers may then gain access via a VLEC source and ferry the data back and forth to their computers through a Client VLEC Dongle, key, or other appropriate adapter.

A VLEC system designed in accord with the teachings of the present invention may interface with new or existing building internal electrical wiring. By positioning architectural lighting fixtures that dual as VLEC and/or server optical transceiver (XCVR) transceivers, a building space may be efficiently illuminated while accomplishing high-speed secure wireless data communication. In some embodiments, a VLEC and an XCVR may be used interchangeably. The LEDs that are incorporated into VLEC transceivers are environmentally friendly and relatively insensitive to atmospheric conditions. LEDs can be configured as directional lights by providing or incorporating various lenses or reflectors, or may alternatively be configured as omni-directional lights for room lighting purposes. The room lighting colors of a VLEC device may be made to mimic traditional lighting of today, including intensity, color, and color temperature. A VLEC system has the added benefit of communicating by pulsing the LEDs in such a way as to communicate data at nearly the same rate or capacity, or faster rate or capacity, as compared to modern fiber optic channels.

Embodiments designed in accord with the teachings of the present invention may fully integrate into existing networks and infrastructures presently in use. Security and access levels may be controlled on the back end of the network by employing known equipment such as a firewalls, routers and hubs. Embodiments of the present invention are meant to improve and compliment communication areas that fall short in today's existing infrastructure, from full duplex communications of voice to ultra high speed broadband packet data transfers for full motion video, on highly reliable, scalable, stable and fully redundant infrastructures. Most deployments are easily started by taking advantage of existing infrastructures and applying low cost fill-in or gap solutions. Many modulations schemes available today, such as CDMA, OFDM, TDM, PWM, PPM, PDM, AM, BPSK and specific layers of QAM, to name a few, may be used in conjunction with the present invention. Access BPL and In-house BPL capacity, including both governmentally licensed and unlicensed BPL/PLC apparatus and methods, may augment the present invention in a quest for a complete system design. Low-power, unlicensed BPL/PLC systems may be used to provide high speed digital communications capabilities by coupling RF energy onto the power lines inside a building. In addition, higher speeds than available from existing Access BPL technology may be obtained in the preferred embodiments by encasing the electrical wire in conduit, thereby implementing Shielded BPL (S-BPL) in accord with the present teachings. S-BPL as taught herein prevents or further reduces unwanted Electro-Magnetic Interference or Radio Frequency Interference (EMI/RFI) and thereby may provide higher data speeds for a variety of applications using VLEC embodiments.

In at least one embodiment, the present invention includes the use of visible light as the communications channel between client and host, which offers security, reliability, system testing and configuration, bandwidth, infrastructure, and mobility, among other things. Yet another advantage of the present invention improves security, because light does not go through walls, in contrast to radio communications, and steps can be taken to obstruct visible transmissions with a much greater certainty than with high frequency radio waves.

In some embodiments, the invention enables individual or selected groups of LED lights to be selectively configured for optimal physiological and psychological effects and benefits for one or more applications. LEDs may be readily reconfigured without changes to physical structures for diverse applications having different requirements for optimal physiological and/or psychological effects and benefits.

In some embodiments, the present invention has the capacity to provide low power communications for energy management, emergency back-up, security and special applications utilizing alternative power sources such as batteries or solar cells.

In at least one embodiment, the present invention reduces peak inrush current by controlling the timing of illumination and other equipment start-up.

In some embodiments, the present invention also has sufficient communications bandwidth to incorporate smart video integration. The present invention also has the ability to provide embedded communications through visible light, whether or not the visible light is at an intensity great enough for sufficient duration to be detected by the human eye.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE DRAWINGS

FIG. 20 illustrates by block diagram an embodiment of a data packet in accord with an embodiment of the present invention.

FIG. 21 illustrates a waveform of a visible light emission from an active and visually illuminated LED in accord with an embodiment of the invention.

FIG. 22 illustrates a waveform of an invisible or barely perceptible light emission from an active and dark LED in accord with an embodiment of the invention.

DETAILED DESCRIPTION OF THE PREFERRED EMBODIMENTS

Figure 1:
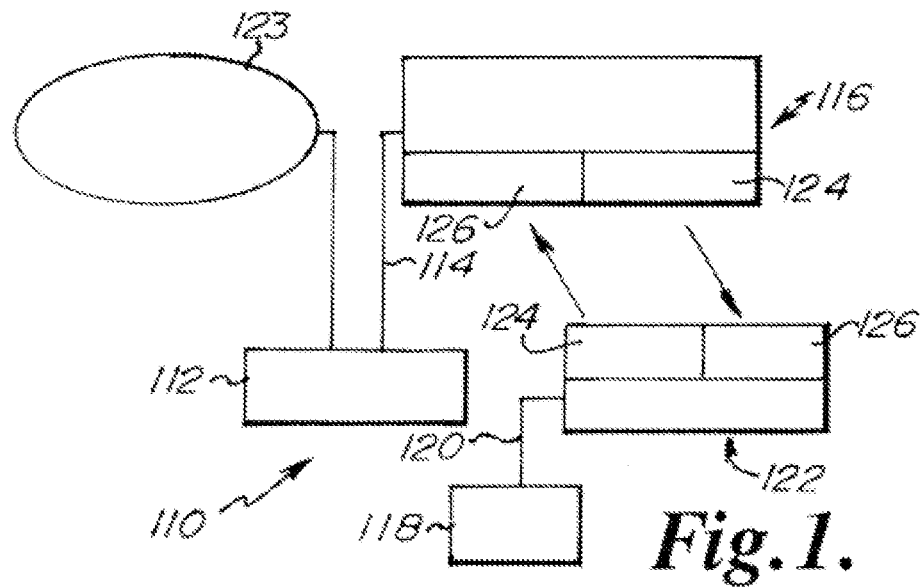
FIG. 1 is a block diagram of one embodiment of the Communication System.

While this invention may be embodied in many different forms, there are described in detail herein specific alternative embodiments of the invention. This description is an exemplification of the principles of the invention and is not intended to limit the invention to the particular embodiments illustrated. For the purposes of this disclosure, like reference numerals in the figures shall refer to like features unless otherwise indicated.

In each of the embodiments discussed below, the LEDs may be formed of the same or different colors. The controller may be configured to select the color of the LEDs to be illuminated forming the light signal.

FIG. 1 depicts an exemplary embodiment 110 of an LED light and communication system. FIG. 1 shows a server PC 112 connected via a USB cable 114 to a server optical transceiver (XCVR) 116, and a client PC 118 connected via a USB cable 120 to a client optical transceiver 122. The server PC 112 is in communication with a network 123 via a CAT-5 cable, for example. The server optical XCVR 116 and the client optical XCVR 122 are substantially similar in at least one embodiment. An exemplary optical XCVR (or, simply, "XCVR") circuit includes one or more LEDs 124 for transmission of light and one or more photodetectors 126 for receiving transmitted light. LEDs and photodetectors are well known to those of ordinary skill in the art and, as such, their specific operation will not be described in detail. The term "photodetector" includes "photodiodes" and all other devices capable of converting light into current or voltage. The terms photodetector and photodiode are used interchangeably hereafter. The use of the term photodiode is not intended to restrict embodiments of the invention from using alternative photodetectors that are not specifically mentioned herein.

In at least one embodiment, the XCVR circuit may include an RS232 to USB conversion module. The transmit pin on the USB conversion module drives the driver electronics for the LEDs. In some embodiments, the XCVR circuit includes high intensity LEDs. In some embodiments it may be desirable to use high intensity LEDs to enhance lighting, to improve data transmission, or both. In at least one embodiment, a 12 volt DC, 3 amp power supply is sufficient for powering an array of high intensity LEDs.

In some embodiments, the XCVR circuit further includes an amplifier for amplifying the optical signal received by the photodiode. The output of the amplifier may be fed into level shifting circuitry to raise the signal to TTL levels, for example. The signal is then fed into the receive pin of the RS232 to USB module.

In some embodiments, a 9V battery may be used to power the amplifier circuitry. Significant noise is generated by switching high brightness LEDs on and off at 200 mA and 500 kbps, for example. Powering the amplifier with a battery may reduce these noise problems by reducing or removing transients.

It should be noted that in some embodiments, the LED can both emit and receive light. In such an embodiment, the LED can act both as a transmitter or receiver. More information on such bi-directional LEDs can be found in U.S. Pat. No. 7,072, 587, the entire contents of which are expressly incorporated herein by reference.

In at least one embodiment, the optical XCVRs, or circuitry attached thereto, include modulation circuitry for modulating a carrier signal with the optical signal. Modulation can be used to eliminate bias conditions caused by sunlight or other interfering light sources. Digital modulation can be accomplished by using phase-shift keying, amplitude-shift keying, frequency-shift keying, quadrature modulation, data compression, data decompression, up converting, down converting, coding, interleaving, pulse shaping or any other digital modulation communication and/or signal processing techniques known by those of ordinary skill. Similarly, such XCVRs can include demodulation circuitry that extracts the data from the received signal. Modulation and demodulation techniques for modulating light signals are described in U.S. Pat. Nos. 4,732,310, 5,245,681, and 6,137,613, the entire contents of each being expressly incorporated herein by reference.

Additional information regarding data communication can be found in International Publication Number WO 99/49435, the entire contents of which are expressly incorporated herein by reference.

In some embodiments, the use of XCVRs as light sources can reduce energy consumption and simplify communications by reducing the filtering or modulation complexities necessary to distinguish data signals from extraneous lighting sources.

In some embodiments, controlling of the relative power applied to each one of the red, green, blue LEDs, enables different colors of light to be produced. This concept is well-known as the RGB model, and is used today in nearly all video displays. Color televisions and computer monitors, for example, incorporate very small red, green and blue (RGB) dots adjacent to each other. To produce white regions on the screen, all three RGB dots are illuminated. Black dots are the result of none of the RGB dots being illuminated. Other colors are produced by illuminating one or more of the dots at different relative levels, or alternatively controlling how many closely adjacent dots of one primary color are fully illuminated relatively to the other two primary colors.

Through the use of RGB LEDs, color temperature of an LED light panel or LED light fixture may be adjusted or controlled, and may be varied in real time without making any hardware or apparatus changes. Instead, power applied to the RGB LEDs is adjusted to favor one or another of the RGB LEDs. Since the light emitted from the RGB LEDs is approximately full-spectrum light, the color-rendering index may also be relatively high, particularly when compared to mercury or sodium vapor lamps, making the light feel very natural.

Figure 2:
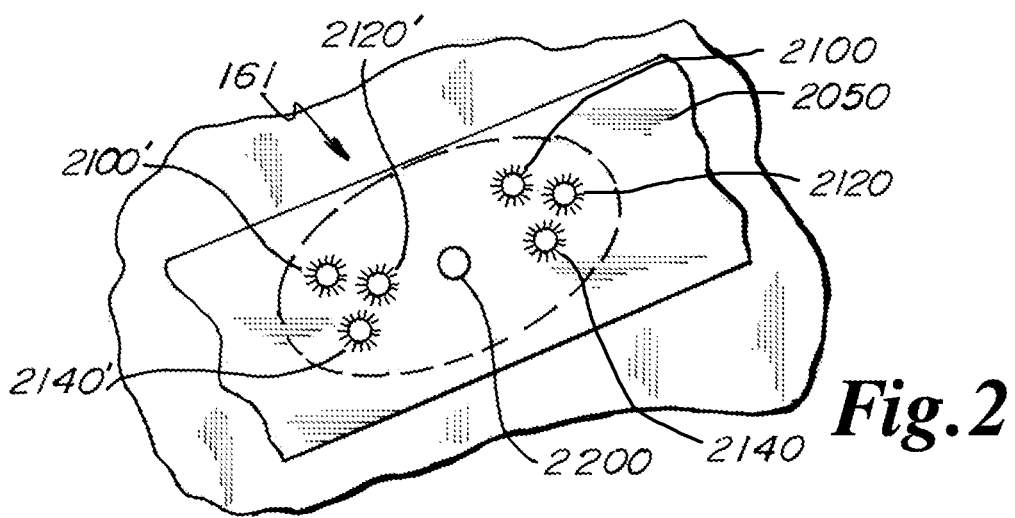
FIG. 2 is a detailed view of an LED light source in any exemplary embodiment of the present invention.

A variety of physical and electrical configurations are contemplated herein for LED light source 161. As illustrated in FIG. 2, light source 161 may replace a standard fluorescent tube light fixture. This can be accomplished by replacing the entire fixture, such that ballasts and other devices specific to fluorescent lighting are replaced. In many cases, this will be the preferred approach. The fixture may then be wired for any suitable or desired voltage, and where a voltage or current different from standard line voltage is used, transformers or power converters or power supplies may be provided. When a building is either initially being constructed, or so thoroughly remodeled to require replacement of wires, the voltage may be generated in transformers which may be located outside of the occupied space, such as on the roof, in a utility room, basement or attic.

In this case, line voltage, such as 120 VAC at 60 Hertz in the United States, may pass through the electrical connector pins. LED base 2050, in such case, may be designed to insert directly into a standard fluorescent socket, such as, for exemplary purposes only and not limited thereto, the standard T8 and T12 sockets used in the United States. In such case, either RGB LEDs 2100-2140 are arranged and wired to directly operate from line voltage, or appropriate electronics will need to be provided directly in LED base 2050 to provide necessary power conversion. In yet another conceived alternative embodiment, power conversion may be provided through switching-type or other power conversion circuitry to alleviate the need for any rewiring, though in these instances the power conversion circuitry will need to accommodate the particular type of ballast already in place.

For LED light source 161 to replace an existing bulb, regardless of type, and benefit from the many features enabled in the preferred embodiment, communications circuitry must also be provided. This communications circuitry is necessary to properly illuminate each of the red, green and blue LEDs to desired color, to transport data through a optical communication channel.

In accord with at least one embodiment of the invention, LEDs are used to transmit through an optical communication channel several kinds of data, including identity, location, audio and video information. The use of an optical communication link provides large available bandwidth, which in turn permits multiple feeds of personal communication between LED light sources and dongles or keys similar to or in excess of that of cell phones. The optical data is transferred at rates far in excess of those detectable by the human eye, and so a person is not able to detect any visible changes as the data is being transferred. Additionally, because optical illumination is constrained by opaque objects such as walls, the location of an access dongle or key and associated person can be restricted to a particular room, hallway or other similar space.

In the past, prior art GPS systems and cell phone triangulation techniques are typically only accurate to one or several hundred feet. Horizontally, this prior art precision is adequate for many applications. However, vertically several hundred feet could encompass twenty floors in an office or apartment building. In some embodiments, an optical transceiver is capable of precision to a room or room light fixture, for improved location identification than otherwise previously available.

It is anticipated that each transmission of a communication pulsed light signal will include a code representative of the originating XCVR. Optionally additional intermediate XCVRs may add a communication pulsed light signal code.

In one embodiment, the computer may initiate an inquiry to locate the identification code corresponding to an optical XCVR. In this embodiment, the computer 22 would transmit a signal outwardly through the optically connected XCVRs to request identification of a particular XCVR identification code. In one embodiment the inquiry may be global, or may be limited to specific periods of time or other specific conditions such as location. In one embodiment each individual XCVR upon receipt of the command inquiry may forward by pulsed light signals the identification codes of all XCVRs within a particular location, because identity codes are being continuously transmitted by each optical XCVR.

Since location may be relatively precisely discerned, optical transmitter or LEDs 2100-2140 may in one embodiment be configured to change color, flash, or otherwise be visually changed or manipulated to assist with directional guidance, personnel or intruder identification, energy management, or to facilitate the meeting and connection of individuals. To achieve these objectives, a building needs to be wired only for lights, saving a huge infrastructure of other wires and fixtures.

Figure 3:
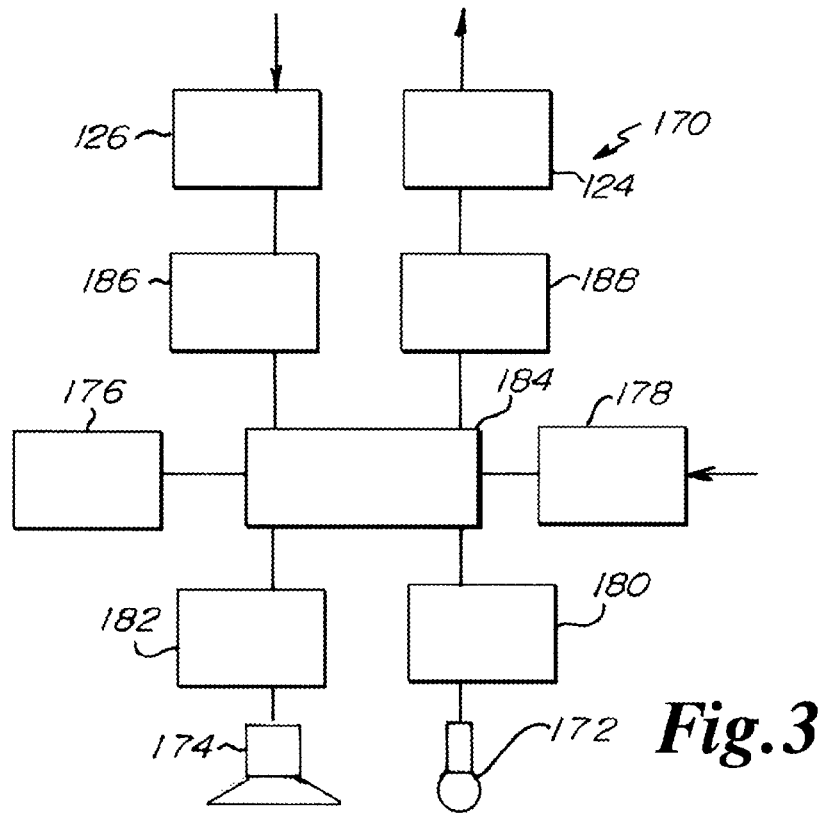
FIG. 3 is a block diagram of an alternative embodiment of the Communication System.

Some embodiments of an LED XCVR light fixture may include any or all of the following devices: a microphone 172, a speaker 174, a rechargeable battery 176, and a video camera or camera 178, as shown in the simplified block diagram of FIG. 3. In at least one embodiment, the microphone 172 is in communication with an analog-to-digital converter (ADC) (not shown) for converting the analog speech input to a digital signal. An amplifier circuit 180 can be used to boost the microphone signal. The signal can be amplified prior to or after the ADC. In some embodiments, the speaker is communication with a digital-to-analog converter (DAC) (not shown) for converting the received digital signal to an analog output. An amplifier circuit 182 can be used to boost the speaker signal. The signal can be amplified prior to or after the DAC. The processor 184 shown in FIG. 3 converts the digital signals from the microphone/amplifier to data packets that may be used for transmission by the optical XCVR. Similarly, the processor converts the data packets received by the optical XCVR to audio out signals directed to the speaker. The processor can convert data packets received from or directed to the video camera.

Furthermore, the optical XCVR may include non-volatile memory (FLASHRAM, EEPROM, and EPROM, for example) that may store firmware for the optical XCVR, as well as text information, audio signals, video signals, contact information for other users, etc., as is common with current cell phones. In some alternative embodiments, a hard-drive may be used instead of these semiconductor-based memory devices.

The optical XCVR may include one or more photodetectors 126 for receiving transmitted LED or other light signals, and one or more LEDs 124 for transmitting LED signals, as shown in FIG. 3. In some embodiments, an optical signal amplifier 186 is in communication with the photodetectors 126 to increase the signal strength of the received light signals. In at least one embodiment, the LEDs are in operative communication with an LED power driver 188, ensuring a constant current source for the LEDs.

In some embodiments, an optical XCVR may include circuitry that performs modulation, demodulation, data compression, data decompression, up converting, down converting, coding, interleaving, pulse shaping, and other communication and signal processing techniques, as are known by those of ordinary skill in the art.

In at least one embodiment, each and every optical XCVR is embedded with a unique code, similar in principle to the MAC address of a computer, for example. The optical XCVR broadcasts the unique code at regular intervals, at irregular intervals or with each transmitted data packet if desired. Optical XCVRs located within the user's building and near the user may then receive the unique code transmitted by another optical XCVR or dongle or key device.

There are numerous applications of such a design. For example, in some embodiments, an optical XCVR may be engaged to a door lock. When a user with an optical XCVR name tag approaches a locked door, the name tag may broadcast the unique code, and an optical XCVR in communication with the door lock may receive the code, and if acceptable, unlock or open the door. A table of acceptable codes may be stored in a memory device that is in communication with, and accessible by, the door's optical XCVR. Alternatively, the door's optical XCVR may transmit a code to a central station which compares the user's code against a table of approved codes and then sends a response either allowing or denying access.

Building management in accord with another embodiment of the invention further includes automated secured access control to apparatus such as doors, drawers, electronic computer operations, thermostats, and any other devices that may be electronically controlled. By means of LED communication, the location of unauthorized devices as well as persons can be tracked or polled by the system. Doors, either locked or unlocked, can be manipulated in response to the location or movement of these devices or persons.

Figure 4:
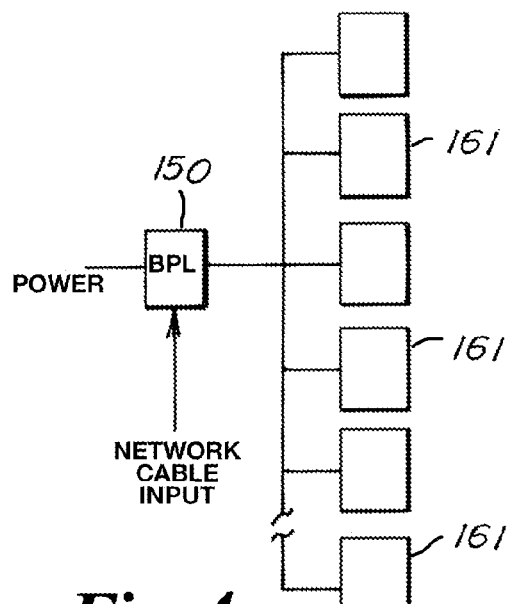
FIG. 4 is a block diagram of an alternative embodiment of the Communication System.

As seen in FIG. 4, the electrical wiring in the hallways and/or rooms may include Broadband Over Power Line (BOPL). As such, an optical XCVR name tag may be used to provide access to the Internet via the optical XCVRs in the hallways and rooms. A person walking down the hallway may receive a phone call on their name tag from a person on the other side of the world as long as the other person was using the Internet to communicate and knew the unique code of the optical XCVR name tag. Such communication is possible because the Internet is based upon transmission of packetized data, a form ideally suited for use with an optical XCVR.

FIG. 4 illustrates a simplified block schematic diagram of an electrical circuit used to couple power and data to one or a plurality of LED light sources 161. Power, which may be either AC or DC current is coupled through a power line bridge 150 with data from a network cable input, for example. The source of the data may include various computer outputs such as control processor output or network connections such as commonly found on Local Area Networks (LAN), Wide Area Networks (WAN) or through the Internet. In accord with one embodiment, the wiring between power line bridge 150 and LED light source 161 is shielded by passing through a conduit or the like, defining a Shielded Broadband-over-Power-Line (S-BPL) connection that is both resistant to interfering communications and also produces almost no radiant energy.

Figure 5:
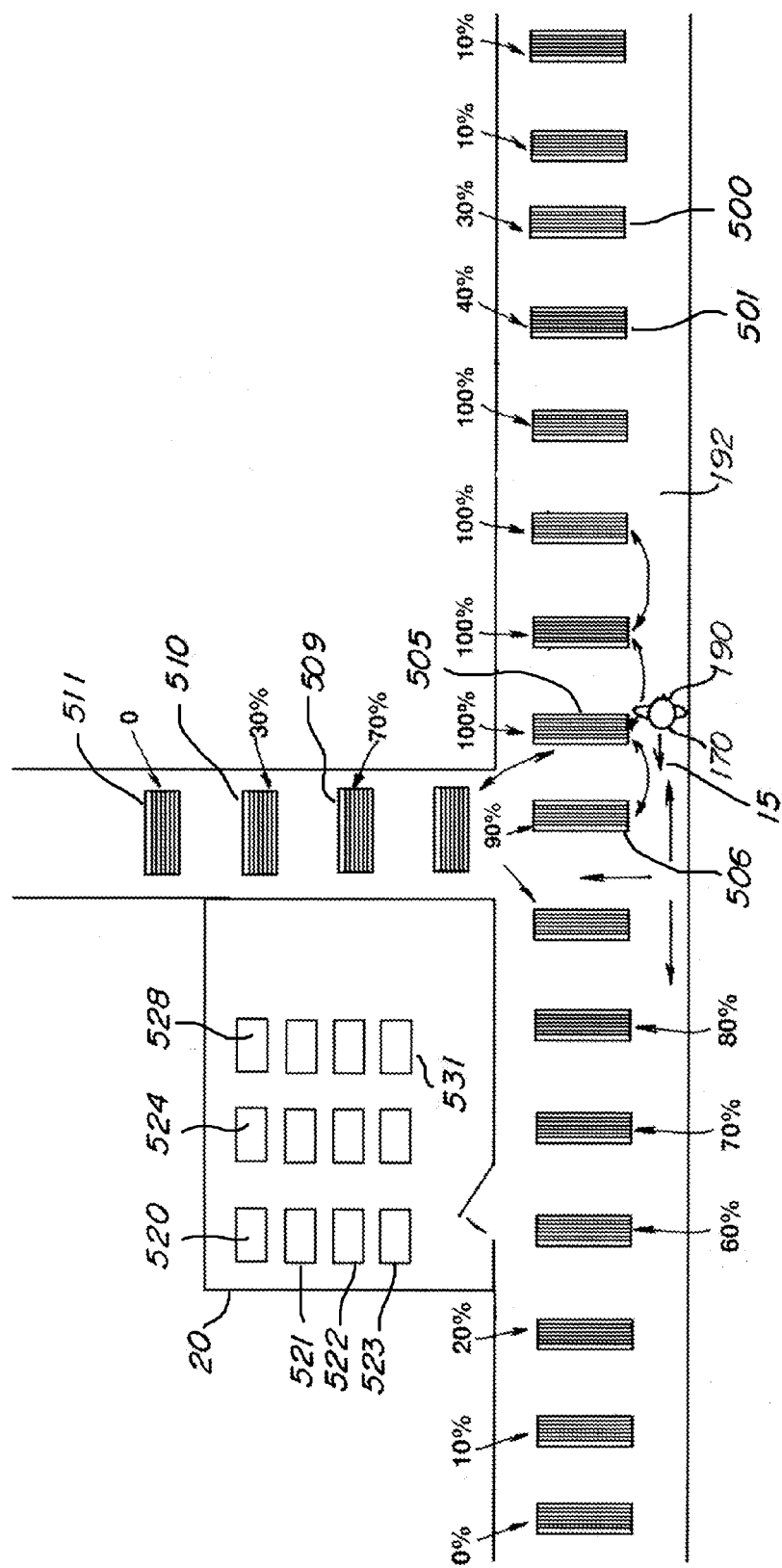
FIG. 5 is a block diagram of an alternative embodiment of the Communication System.
Figure 6:
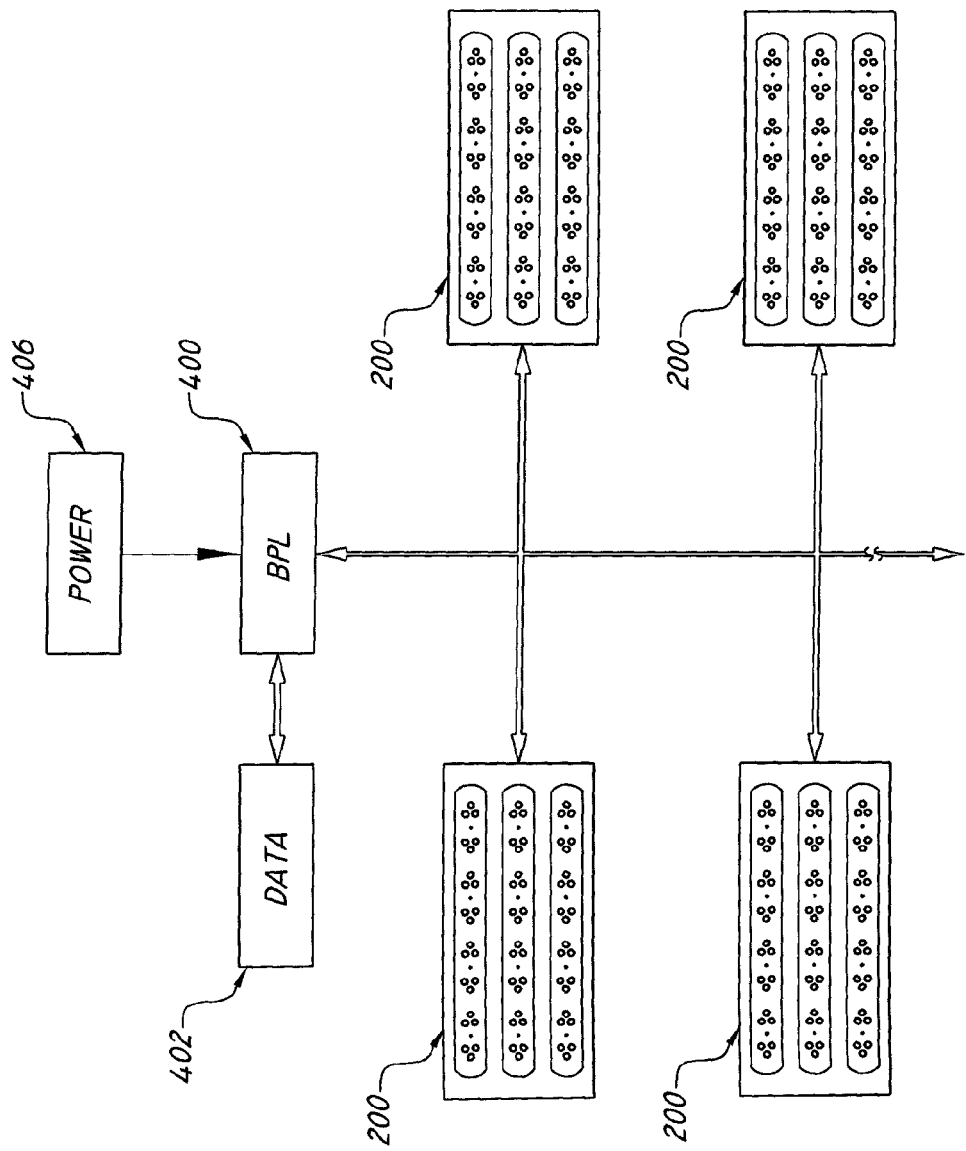
FIG. 6 is a block diagram of an alternative embodiment of the LED Communication System, depicting light sources in communication with a broadband over power line service.
Figure 7:
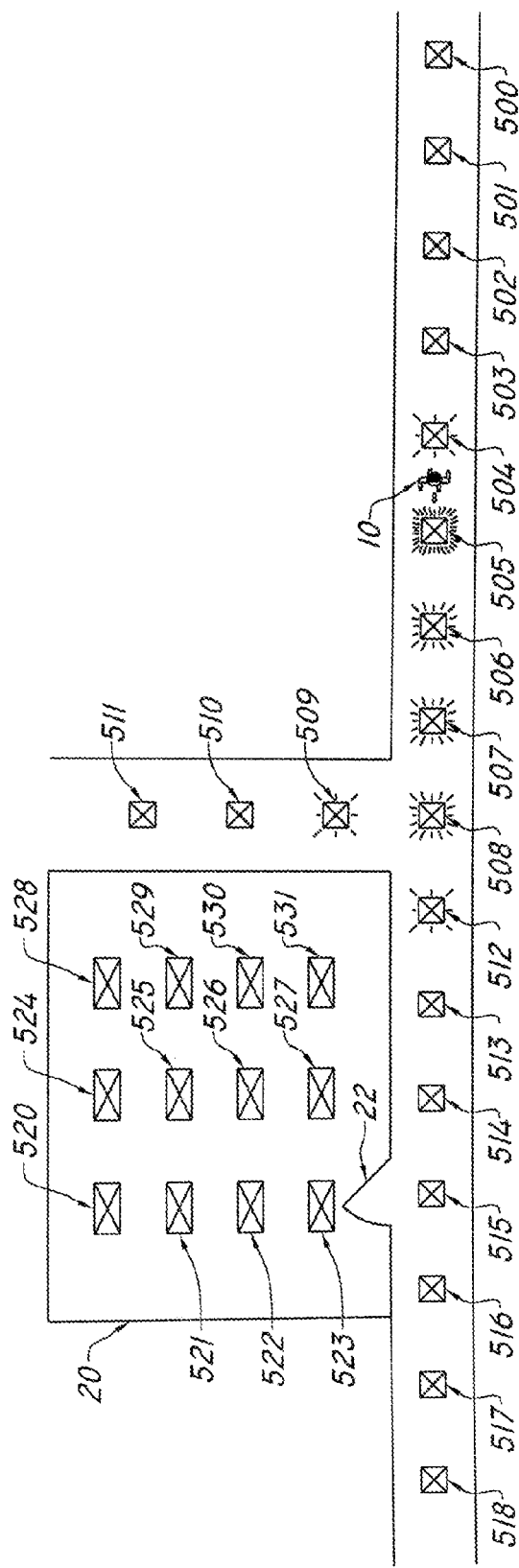
FIG. 7 is a block diagram of an alternative embodiment of the LED Communication System, depicting an energy management scheme.
Figure 8:
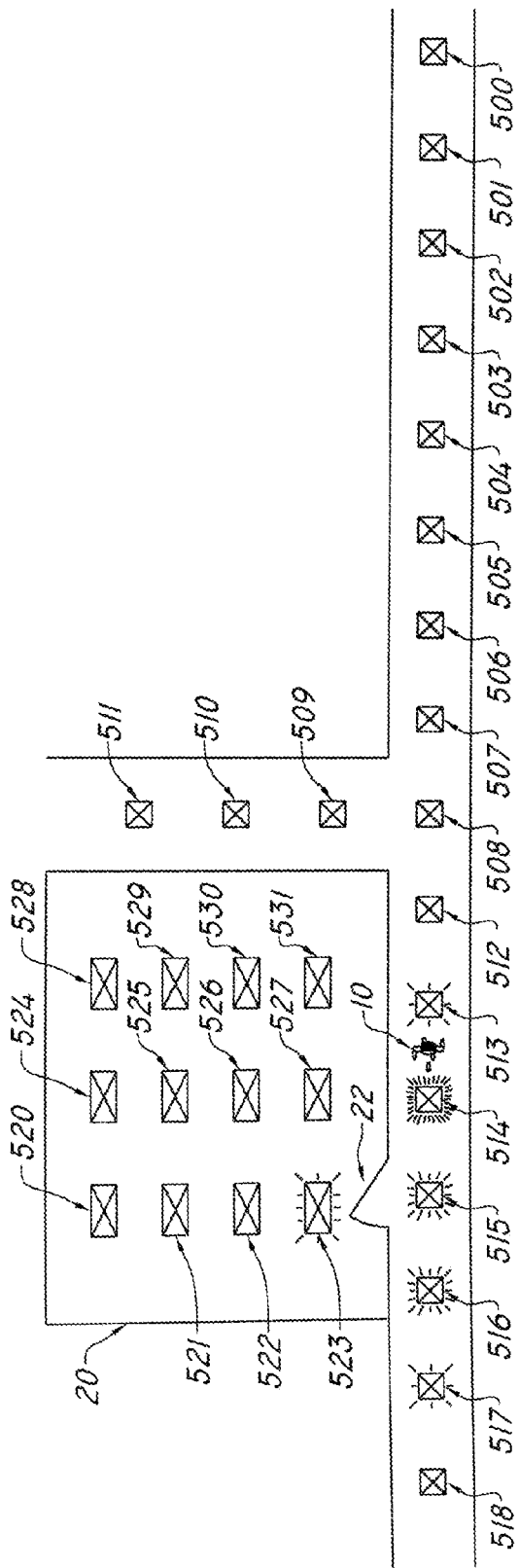
FIG. 8 is a block diagram of an alternative embodiment of the LED Communication System, depicting an energy management scheme.
Figure 9:
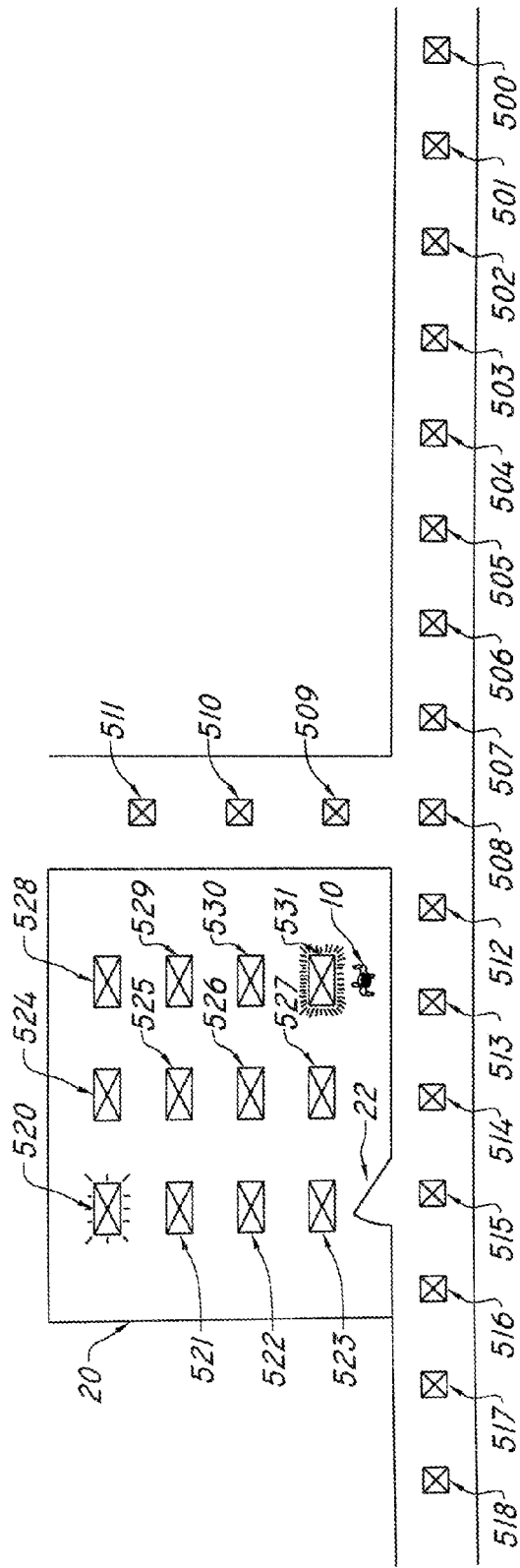
FIG. 9 is a block diagram of an alternative embodiment of the LED Communication System, depicting an energy management scheme.

In at least one embodiment, the optical XCVR name tag may be used in conjunction with the LED lighting in hallways, rooms, etc. to reduce energy consumption, as shown in FIG. 5. For example, all the lights in a hallway may have a standby setting such that they are relatively dim or even off. As a person with an optical XCVR name tag proceeds down a hallway, the lights in front of the person turn on in response to a transmitted signal (e.g. the unique code of the name tag). Alternatively, sensors may detect the presence of an individual. As the person moves beyond a light, the light returns to its standby setting of dim/off brightness. IN some embodiments, a signal may be communicated to an XCVR that the individual has passed, and is no longer present at this particular location. The presence of an individual proximate to an XCVR may be determined by either recognition of a signal or through the failure to continue to recognize a signal or by a proximity calculation as based on a controller receiving a signal from a remote location which indicates recognition of an optical XCVR name tag. Alternatively, sensors may be used. A proximity may then calculated where initial or previous XCVR light sources are extinguished as an individual passes a particular location. In other embodiments, the lights can gradually become brighter, as a percentage of full brightness, as a person approaches, and then gradually dim, as a percentage of full brightness, as a person moves away based on proximity calculation as earlier described.

The lights shown in FIG. 5, in accordance with an embodiment of the invention, may have AC wiring with data carriers such as S-BPL, and static locations encoded into the system. Thus a person 190 entering a hallway 192 with an optical XCVR communications badge could use only those lights needed for his travel. As the person progresses toward a destination, the lights behind may be no longer needed and so may be programmed to turn off. These lights may function variably from 10 to 100% as needed, for example. As shown in FIG. 5, the person 190 is approximately adjacent to light 505 and traveling in the direction shown by arrow 15 towards light 506. From this position, person 190 might prefer to be able to see into the branching corridor containing lights 509-511. With appropriate central computer control and programming which will be readily understood and achieved by those skilled in the computer arts, the illumination of these neighboring lights may be increased, to provide sufficient illumination to ensure the safety of person 190. Since different persons will have different desires regarding the extent of adjacent illumination, an embodiment of the present invention may incorporate custom programming of such features by individual person 190, or within standard preset selections, where a relatively large number of lights are illuminated adjacent to person 190, or where only a minimum number of lights are illuminated. Again, the level of illumination may additionally vary with relation to the person, the geometry of the building space, in accord with personal preferences, or for other building management reasons.

When person 190 has traveled farther, lights 509-511 may be extinguished, in effect providing a moving "bubble" of illumination surrounding person. Other lights are automatically shut-off or dimmed as desired and controlled by program. As FIG. 5 illustrates, lights within room 20 may similarly be activated and controlled, so for exemplary purposes as illustrated, light 531 may be at full intensity, lights 521-530 may be extinguished completely, and light 520 may be operating in a greatly dimmed state, but still providing adequate lighting to ease person 190.

The present invention reduces the extent of human interaction required to control various functions such as light switches and thermostats, while simultaneously increasing the capabilities of such controls. Individual or selected groups of lights may be selectively configured for optimal physiological and psychological effects and benefits for one or more applications, and then may be readily reconfigured without changes to physical structures for diverse applications having different requirements.

Such embodiments are an improvement over conventional motion detectors, due to the "smart" nature of the optical XCVRs. Rather than waiting for a time delay as is the case with motion detectors, the optical XCVRs (and in some embodiments the optical XCVRs in conjunction with software) in the LED XCVR lighting fixture recognize immediately that the person has moved beyond a particular light, allowing that particular light to be dimmed or turned off. Also, this smart technology may be used to turn lights on only for people with the correct code embedded in an optical XCVR name tag. In such an embodiment, the user can walk into a restricted area, and if not authorized to be there, the lights would remain off, and if authorized the lights would turn on. Alternatively, a teacher with an optical XCVR name tag grading papers in a classroom, for example, may use the name tag to turn only the lighting near the teacher's desk at full brightness, while other lighting in the room remains at a dimmer, more energy efficient, setting.

Energy management is not solely limited to total power consumption. Peak inrush current is also an important factor monitored by many utility companies. This is the peak power draw of the power customer, for exemplary purposes within each twenty-four hour period. By controlling the timing of illumination and other equipment start-up, electrical draw may be gradually ramped up. Many devices initially draw more power at start-up than when operational. So, since each light is individually addressed and controlled, and appliances or machines may similarly be controlled, the communications afforded by the present invention permit much smaller banks of devices to be started, allowing those devices to surge and then settle to lower energy requirements before starting the next bank of devices. Some devices and machines very quickly drop down to lower power draw. LED light sources are such a device. Banks of these LED light sources may very quickly and sequentially be started. Other devices, such as electrical compressors found in heat pumps, refrigeration and air conditioning units, may require much more time for start-up, before additional devices should be started. Likewise, the particular order of start-up may be optimized for the various electrical loads found within a building. All of this is readily accomplished through simple programming and communication through preferred LED light sources or equivalents thereto.

In other embodiments of the invention, numbers of occupants within a space may be used not only for anticipating illumination, but also to control operation of other appliances and machinery within the building. Exemplary of this, but not limited thereto, are water and space heaters and coolers, and all other electrical or electrically controllable devices.

Because this energy management system requires far fewer human monitors, it provides additional cost saving. A guard would be needed primarily to respond if an alarm were present without having to identify several situations. A guard might be stationed only near a metal detector, for example, without having to monitor other stations. In addition, a more accurate inventory of persons, other assets, or substances in a building becomes possible. An important safety feature, however, is the greater reliability of electronics over personal vigilance.

The present invention also has the capacity to provide low power communications for energy management, emergency back-up, security and special applications utilizing alternative power sources such as batteries or solar cells. Since each individual LED light source may be separately controlled, unnecessary lights may be extinguished in an emergency. Remaining lights may be used to signal emergency routes which may be emergency exits, predetermined shelter such as in the event of a tornado, safe locations potentially determined in real time in the event of an intruder or other hazard. The remaining lights may also or alternatively be used to maintain nominal communications channels within the building. The signals in such instance may be unable to be carried through power lines, and so may alternatively be implemented through a repeater function from one light to the next to travel entirely through a chain of LED optical XCVR light sources.

In accordance with another alternative embodiment of the present invention, building lighting may be modulated with time and date stamps or the like. Video recordings made within the space of modulated illumination will have an optical watermark automatically embedded therein. The embedding of such identifiable signals ensures the integrity of video recordings made under these lights.

If audio and/or video is additionally enabled, either through optical XCVR communications badges or separate optical XCVR wall-mounted devices, the video can be used to capture the last-known conditions of a user or an area.

A network of LED optical transceivers may also be in communication with an intelligent audio/visual observation and identification database system which may be coupled to sensors as disposed about a building. The intelligent system may then build a database with respect to temperature sensors within specific locations, pressure sensors, motion detectors, optical XCVR communications badges, phone number identifiers, sound transducers, and/or smoke or fire detectors. Recorded data as received from various sensors may be used to build a database for normal parameters and environmental conditions for specific zones of a structure for individual periods of time and dates. A computer may continuously receive readings/data from remote sensors for comparison to the pre-stored or learned data to adjust building systems.

In some embodiments, an intelligent observation and identification database system may be arranged to learn the expected times for arrival and departure of individuals and vehicles from various zones. Each time an individual or vehicle enters or exits a zone, the system may record in the database the time and location of the arrival or exit. The further enhanced building management and energy savings by regulating building systems according to learned conditions.

Over time, the system may learn typical paths, times and zones where individuals spend their time. Thus, the intelligent audio/visual observation and identification database system may be coupled to the operational systems for a building, such as locking systems for doors, lighting systems, air conditioning systems, and/or heating systems.

In one embodiment each evolving database and/or mainframe database may be capable of being continuously updated to include data saved by the communication system. Software is preferably loaded onto the computer for creation of files representative of individuals. Access software may be used to communicate with internal databases or external or remote databases, and comparison software may be used to review data as related to the external and/or internal databases.

In one embodiment the evolving database and/or mainframe database may be coupled to additional identification apparatus or systems including but not limited to facial recognition, fingerprint recognition, palm print recognition, voice print recognition, eye scan, and/or signature recognition devices/systems which may be coupled to the input devices for recording of data to be stored within the system for analysis and display of a monitor.

In one embodiment the evolving database and/or mainframe database may include probabilistic analysis software which may be used to assist in the establishment of threshold levels for issuing a warning or investigation signal. In addition the evolving database and/or mainframe database may include Principle Component Analysis (PCA) software and Eigenvector or Eigenspace decomposition analysis software to assist in the establishment of thresholds.

Over time, in one embodiment the communication system may learn typical paths, times and areas where specific individuals spend their time.

In one embodiment the communication system is preferably proactive and is continuously screening and comparing data being input from the XCVRs for comparison to the previously stored records within the accumulated database.

In those embodiments where audio signaling or communications are enabled, and owing to the exact room position detection afforded by the present invention, location specific access intelligence may also be incorporated. As but one example, if a doctor is in a surgical room, the pager may remain silent. Once the doctor exits surgery, then the pager may be reactivated. This control may be automatic, simply incorporated into the programming of the system. In addition to the foregoing, audio and video communications are possible in accord with light communications in locations and environments where cellular or radio communications may be impossible, forbidden, or unreliable, extending existing communications systems.

As stated above, the LEDs may be bi-directional. In at least one embodiment, the optical XCVR is comprised of bi-directional LEDs. In such an embodiment, the optical XCVR is constructed and arranged such that at least one of the bi-directional LEDs allows parallel transmitting and receiving of light signals.

Within the disclosure provided herein, the term "processor" refers to a processor, controller, microprocessor, microcontroller, mainframe computer or server, or any other device that can execute instructions, perform arithmetic and logic functions, access and write to memory, interface with peripheral devices, etc.

In some embodiments, an optical signal amplifier is in communication with the photodiodes to increase the signal strength of the received light signals. In at least one embodiment, the LEDs are in operative communication with an LED power driver, ensuring a constant current source for the LEDs.

In some embodiments, optical XCVRs may be placed in numerous locations as lighting sources. In some embodiments, an XCVR as integral to a ceiling mounted or other type of light fixture may in turn be in direct communication with a computer, processor, microprocessor, mainframe computer or server, and/or other computing device as earlier described through the use of wire, cable, optically via pulsed light communication, over a Broad Band Power Line system or over any other type of communication system.

In one embodiment a series of XCVRs are in communication with the system processor, mainframe computer or server, through sequential transmission and receipt of pulsed light communication signals. In one embodiment the series of XCVRs are in communication with the system processor, mainframe computer or server, through the Broad Band Over Power Line Communication System. In one embodiment the series of XCVRs are in communication with the system processor, mainframe computer or server through the use of cable, wire, or other communication media.

In one embodiment the communication system including the XCVR may be incorporated into a hand held or portable unit. In other embodiments the communication system may be incorporated into a device such as a cellular telephone.

In at least one embodiment, a Visible Light Embedded Communications (VLEC) apparatus, network, and/or system is disclosed. In one embodiment, a VLEC Light Emitting Diode (LED) light panel 200 is coupled to an electronic device through an optical communications channel 300.

In some embodiments, an optical transmitter and receiver are provided and enable communication over optical communications channel 300. A microphone, loudspeaker, microphone and speaker combination, or dual-purpose device may be provided to integrate an auditory communication channel between an LED light fixture and nearby living beings or other animate or inanimate objects. A video camera may be incorporated to capture video or still pictures.

In at least one embodiment, VLEC light panel 200 includes a plurality of LEDs and optical detectors. One or more optical detectors may be provided, and may either be broad spectrum detectors or alternatively color-filtered or sensitive to only a single color.

In some embodiments, a variety of physical and electrical configurations are contemplated herein for LED light panel 200. Light panel 200 may replace a standard fluorescent tube light fixture. The fixture may then be wired for any suitable or desired voltage, and where a voltage or current different from standard line voltage is used, transformers or power converters or power supplies may be provided.

In some embodiments, more than one client is potentially coupled through a common host 200, and is potentially using the same communications channel as another client. When this occurs multiplexing or network communications techniques may be implemented. Among these, but certainly not limited thereto, are such techniques as static or dynamic assignment of unique communications channels, or Time-Division Multiplexing (TDM) of a single channel with appropriate collision resolution.

Communication may further be shared with optically-enabled telephones, TV and music, Internet, public address, computing devices of all sorts, ranging from hand-held devices such as Personal Digital Assistants (PDAs), to massive mainframe computers 60, and including Personal Computers (PCs) 70, 72, printers 76, network storage devices 65, building maintenance wiring such as thermostats, HVAC systems, fire alarms, motion detectors, and any other electrical or electronic apparatus existing or appearing within the room or space, other security and safety devices, appliances, manufacturing machinery, and so forth. Essentially, any device which incorporates or can be made to incorporate sufficient electronic circuitry may communicate with VLEC host 200 to exchange information at any time. Advantageously, many different conditions or devices may be simultaneously monitored and/or controlled when they are broadcasting information through the preferred network, because they are operating on a wide-bandwidth optical link. This information can be used anywhere on the network, which includes the other rooms or a central server.

In accord with one embodiment of the invention, LEDs are used to transmit through optical communication channel 300 several kinds of data, including identity, location, audio and video information. The use of an optical communications link provides large available bandwidth, which in turn permits multiple feeds of personal communication between LED light panels 200 and badges 100 or other clients in bandwidths similar to or in excess of that of cell phones.

Since location may be relatively precisely discerned, optical transmitter or LEDs may in one embodiment be configured to change color, flash, or otherwise be visually changed or manipulated to assist with directional guidance, personnel identification, energy management, or to facilitate the meeting and connection of individuals.

Figure 10:
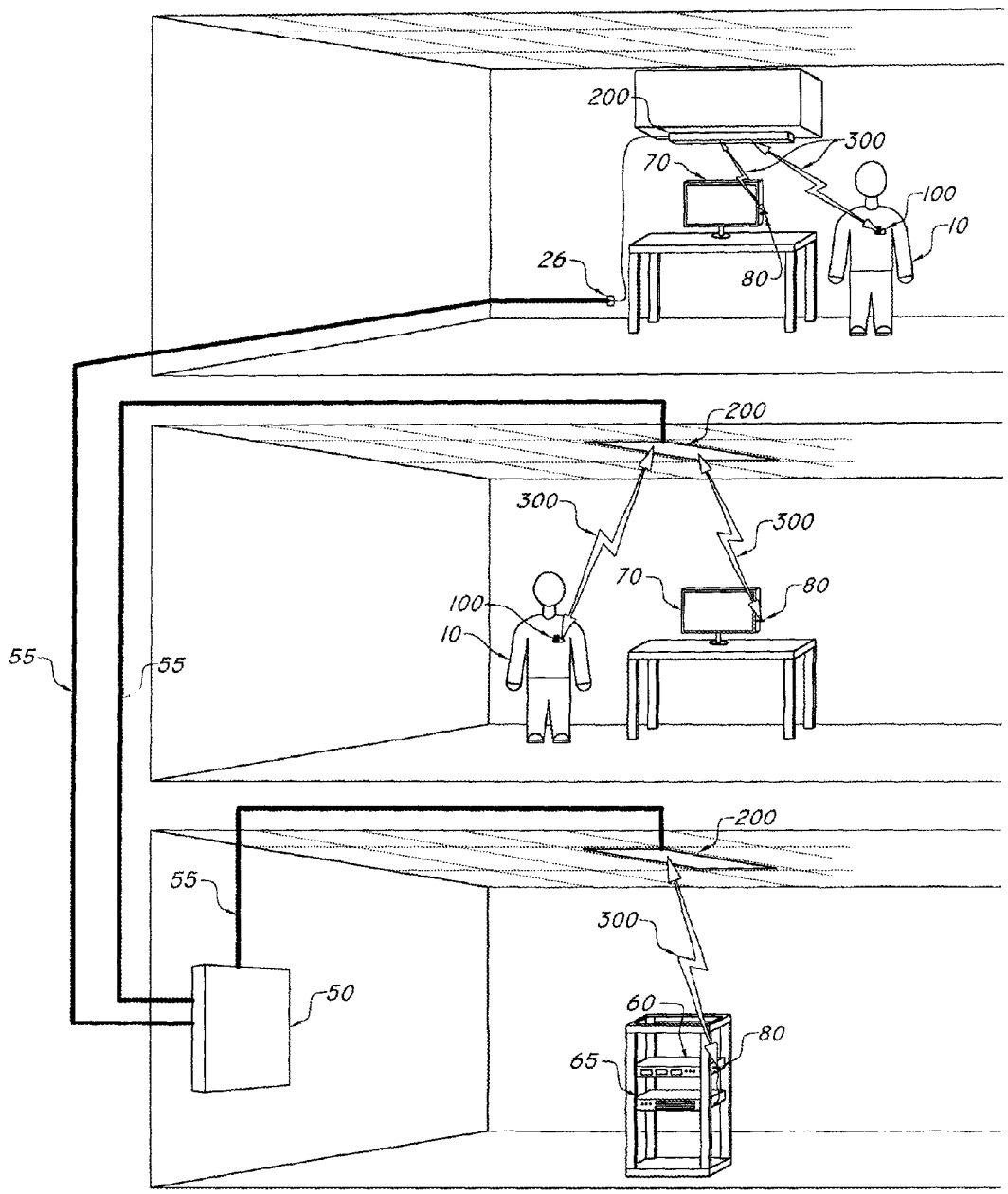
FIG. 10 is a pictorial representation of an alternative embodiment of the LED Communication System, depicting an exemplary security screening process.

FIG. 10 additionally illustrates Broadband-over-Power Line (BPL) transmission of signals through an electrical distribution panel, such as a circuit breaker panel 50 or the like. Preferably, power line wiring from panel 50 is enclosed in conduit 55, thereby shielding the BPL signals to produce S-BPL (Shielded BPL).

Figure 11:
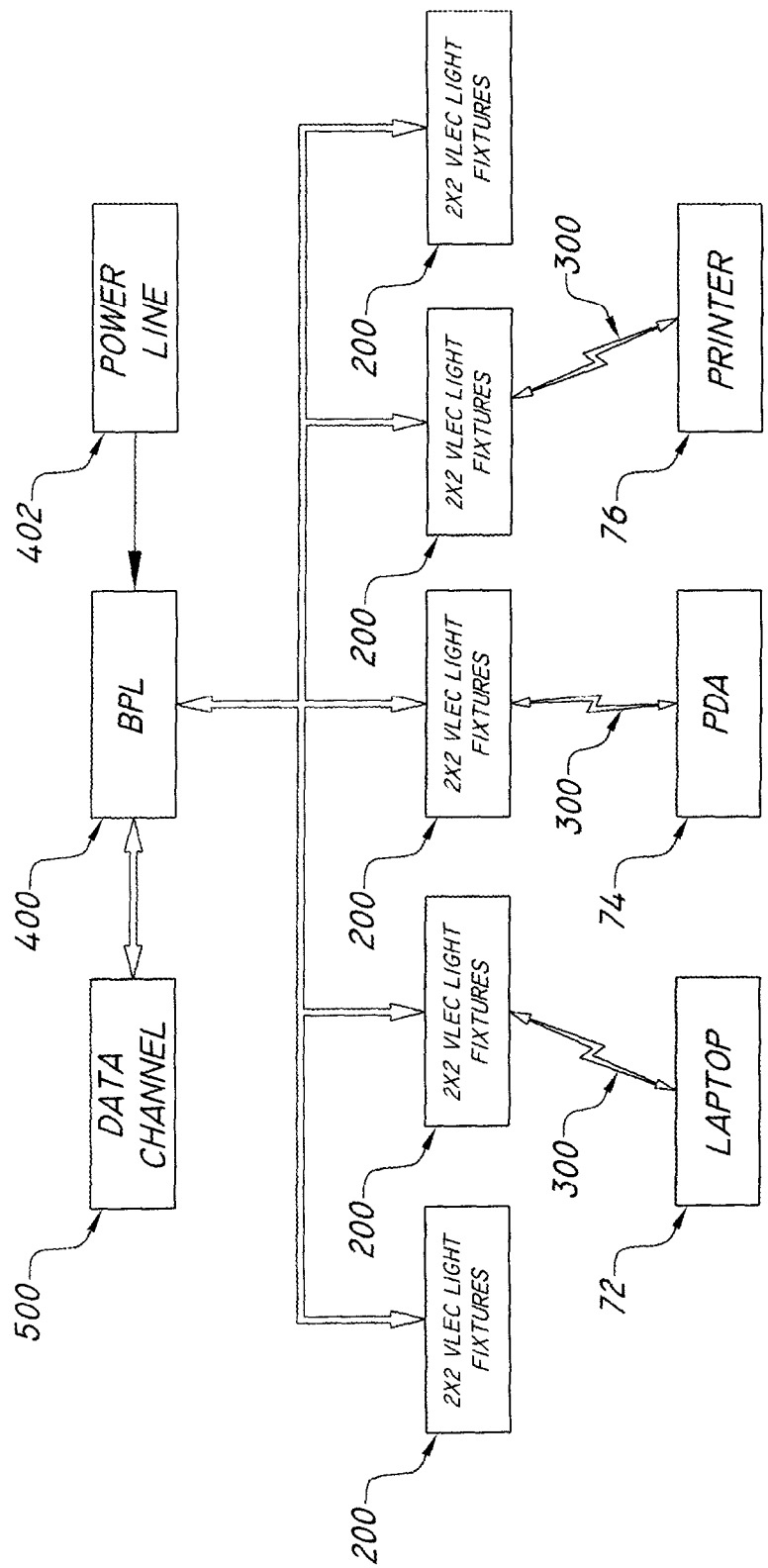
FIG. 11 illustrates by block diagram an electrical schematic of an S-BPL communications system including a plurality of hosts and clients in accord with an embodiment of the present invention.

In accord with the teachings of the present invention, a visible light transceiver can take many shapes and forms while still offering the duality of general lighting and communication. As FIG. 11 illustrates, one of many possible geometries includes a general 2×2 office VLEC lighting fixture 200 configured with LEDs. These installed fixtures 200 will be considered host fixtures for an internal network of communication.

The host fixtures 200 may be configured to manage the relationship of client devices associated with this technology. They can also manage peer to peer relationships to provide redundancy or act as part of an infrastructure void of multiple transport medium interconnects. The host 200 may provide intelligent packet analysis whereby false or inadvertent light photons may be discarded. The means of recognition or validation may be provided by multiple checks and verifications. The VLEC host fixtures 200 and clients will each be assigned a unique Machine Access Code and Electronic Serial Number. The Machine Access Codes and Electronic Serial Numbers will be assigned by the certified manufacturer's facility and matched against a unique relationship table residing on various certified servers. The client devices may then move about a LAN, an entire office building, a WAN or other network and achieve maximum throughput rates similar to that of the location they originated. An added benefit of the preferred visible light embedded communications comprised by optical communications channel 300 is that, with increased bandwidth, back end software for synchronizing data on PDAs and other mobile devices may be improved by almost 5 fold over RF applications as the transport mediums, changing the communications channel bottleneck from RF.

Figure 12:
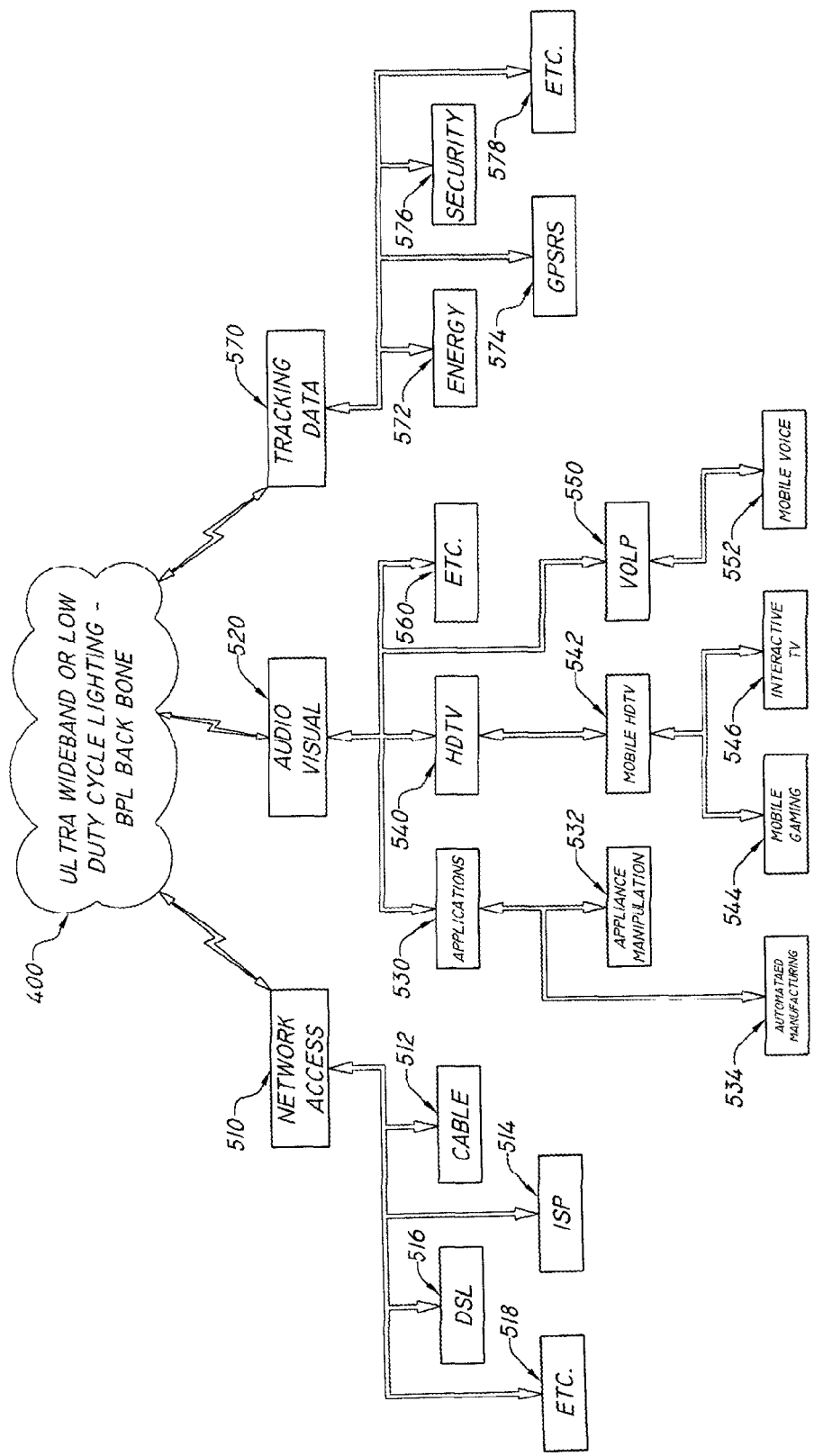
FIG. 12 illustrates by hierachial chart an illustrative sample of the types of data communications to which the teachings of the present invention may be applied, either singly or in any combination.
Figure 13:
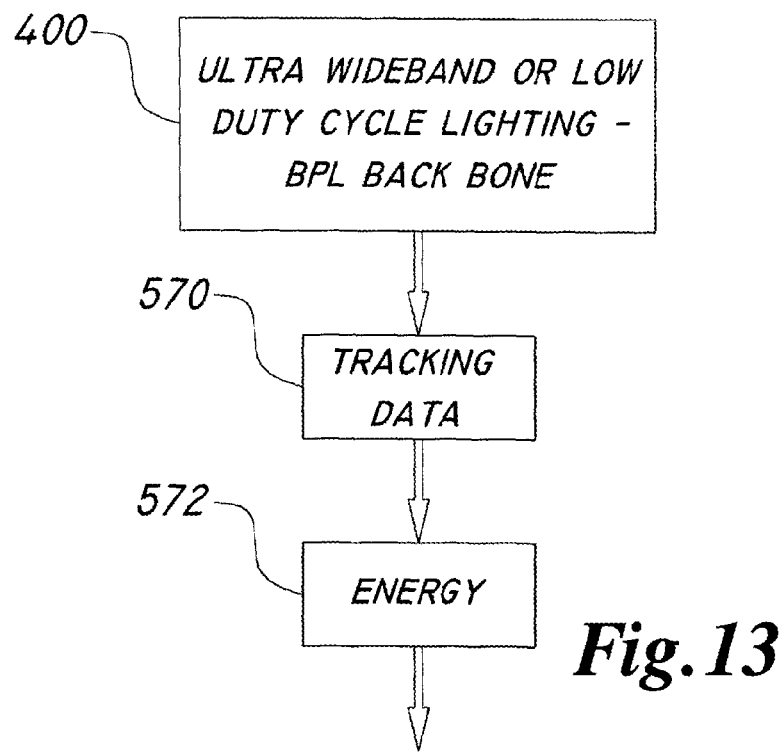
FIG. 13 illustrates by hierarchal chart a single application of the teachings of the present invention.
Figure 14:
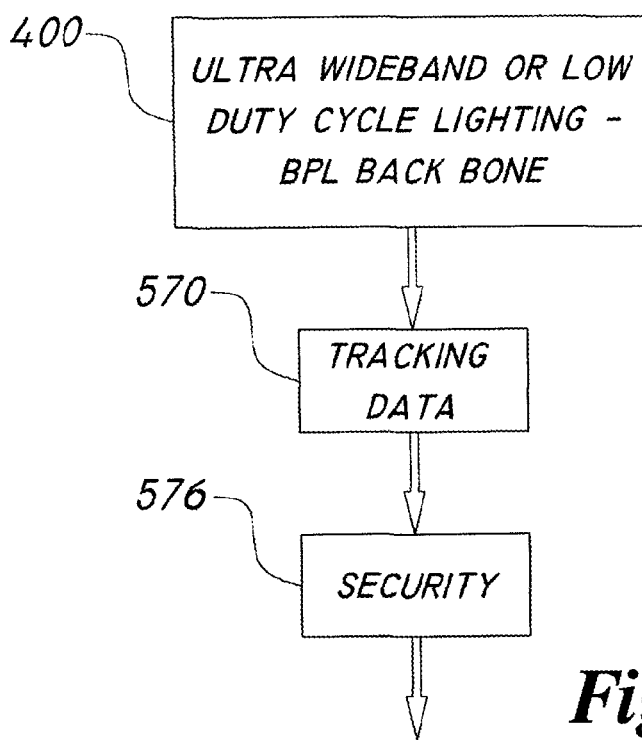
FIG. 14 illustrates by hierarchal chart a single application of the teachings of the present invention.

FIG. 12 illustrates many different types of exemplary communications that may be provided incorporating the VLEC technology of the present invention. Access to the World Wide Web will be enabled through network access 499 to allow users the benefit of web surfing. VLEC technology allows this access to be untethered and nomadic, even though beyond a building or space the network access 499 may be further coupled using conventional cable 512, Internet Service Provider (ISP) 514 links such as satellite or dial-up, DSL 516, or other suitable link 518. AV communications 520 may include various device interface applications 519 such as appliance communications or manipulation 532 and automated manufacturing 534. HDTV 540 is further contemplated, including mobile HDTV 542, mobile gaming 544 and interactive TV 546, but other types of video are additionally contemplated herein, including Slow-Scan TV (SSTV) or other known systems for capturing video information. Telecommunications and personal communications may further be enabled, for exemplary purposes using Voice Over Internet Protocol (VOIP) 550 and mobile voice 552. Other A/V applications are generically identified at 560. In another contemplated communications category, tracking data 570 may be gathered and used based upon the unique addresses assigned to VLEC host fixtures 200. The tracking information may be used for energy management 572, Global Positioning Satellite Routing Systems (GPSRS) 574, security 576, and other tracking applications 578. While communications are conceived as occurring between a plurality of hosts and clients simultaneously, in many instances one client will only be coupling one data stream at a time with a host. To better illustrate this, FIGS. 13-15 illustrate examples of single data category exchanges that might occur between a host and client.

Figure 15:
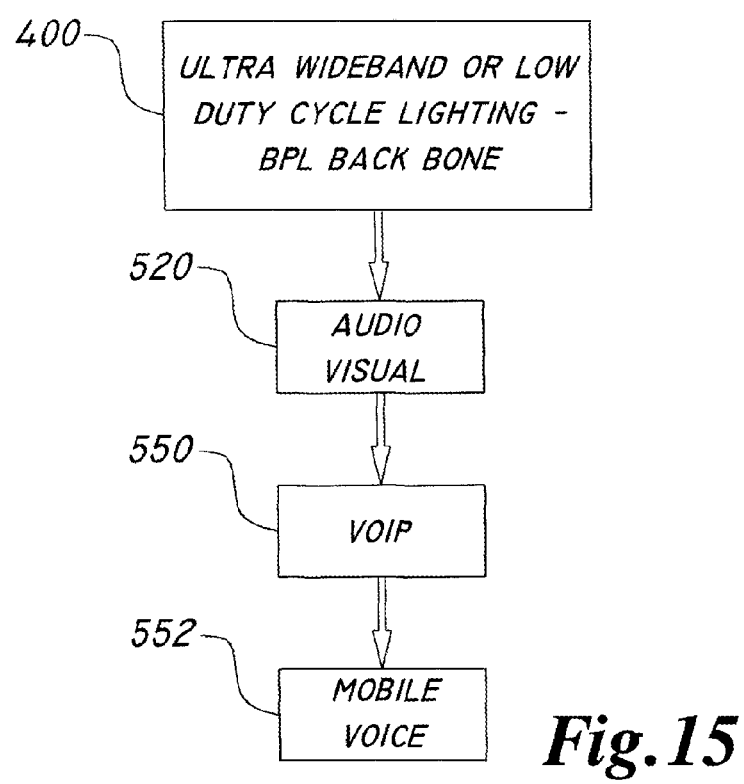
FIG. 15 illustrates by hierarchal chart a single application of the teachings of the present invention.

Considering FIG. 15 in more detail, and to better illustrate the depth of the present invention, core VoIP networks can be installed and integrated into the BPL network and provide a new form of untethered communications. A VLEC to Landline voice call can originate on a client VLEC device and if not connected to the wall can become mobile or nomadic as desired. This ability arises as the VLEC infrastructure would search for active, verified and validated clients in its network under layers 1 thru 4 of the well-known OSI model incorporated herein by reference, which include the physical, datalink, network and transport layers. These layers 1-4 are preferably insulated from the session, presentation and application layers 5-7. Certain Intelligent VLEC fixtures will provide the path to allow the origination of the voice call. As the VLEC client device moves from the originating fixture to the next fixture, the back end software will detect, verify and establish the channel for the client device to use. The distance of the client device will be measured according to the designed calculations of light photons for the best signal, and when this is achieved, an instruction to provide connectivity through this light is issued. In this case, light will be referred to as the Edge VLEC. Multiple Edge VLECs are often designed into the network where voice calls are desired. The Edge VLEC fixtures will then hand off to the next VLEC source that is built into the relational database and continue the call. If the originating call moves towards a predetermined area that is considered outside of the VLEC coverage and the VLEC client device is capable of handling RF communications, then the call can then be set up to contact an RF carrier of choice and begin setting up the call as a cellular event. This would mitigate the amount of RF coverage required to provide a more robust voice cellular network.

An additional feature unique to the VLEC technology with respect to cellular communications is the optional inclusion of an ultra-fast virtual location register that is integrated into various parts of the network, thereby reducing the latency inherent in today's cellular networks. A faster verification of electronic serial numbers is established in this database, thus improving on the time to re-establish voice or data connections. This ultra-fast virtual location register is part of the Virtual Location Register and Host Location Register will be integral in the voice and data communications.

If the originating call then wishes to establish a VLEC VoIP to VLEC VoIP call, the call would be handled by the IP network as a typical VoIP to VoIP call over the Extranet, Intranet or Internet as performed today. As the caller moves about the office, the IP network will again manage the call against light photon strength and, when conditions are met, hand off the call from one VLEC source to the next. As the call is torn down, the validation including digits dialed, origination source, destination source, port and IP address, type of client device, fixture device used for origination, type of call, duration of the call, charges if applicable for the type of call, circuits used if roaming onto the cellular network may all be stored into a data record similar to the call detail record of a standard telephone call. In regards to a pure data session, the VLEC client device will establish its connection through the VLEC light fixture which may be plugged into the wall and/or installed as a general lighting unit. The connection will be established upon the customary protocols of today, again using layers 1 thru 4 of the OSI Model. Once the connection is made, the client is free to move about within the confines of the designed network area while maintaining required throughput rates.

As home devices utilize this same technology, common replacements of incandescent bulbs with VLEC technology is anticipated, thus providing interaction similar to those applied in business.

The NTIA refers to devices as the following. Section 15.109(a), Class-A equipment includes devices marketed for use in a commercial, industrial or business environment, excluding devices which are marketed for use by the general public or are intended to be used in the home. Class B equipment includes devices marketed for use in a residential environment, notwithstanding use in commercial, business and industrial environments. The rules require Access BPL systems to comply with the limits for Class A or B devices depending on whether they are marketed for use in a commercial, industrial or business environment on the one hand or for use by the general public or in the home on the other. Under this Class A/Class B regime, Access BPL systems that operate on medium voltage lines external to residential environments are considered Class A devices. In one embodiment, a VLEC host 200 will interface with the majority of all medium voltage systems available commercially today. Referring to new lights as hosts 200 and mobile or nomadic devices as clients, VLEC technology can simply replace the last mile connection or interconnection for the clients' use. VLEC host 200 will house intelligence necessary to provide visually barely perceptible pulses of light for use by client devices. Environments and equipment sensitive to RF propagation will find benefit from this technology, as a VLEC host 200 will operate safely, and will not disturb or interfere with RF devices in the area. Certain metallic designs often prevent RF from penetrating, where VLEC can perform with success. By way of the present VLEC technology, the area of information propagated by LEDs may be more accurately confined or focused safely and without harm to the environment or humans.

Figure 16:
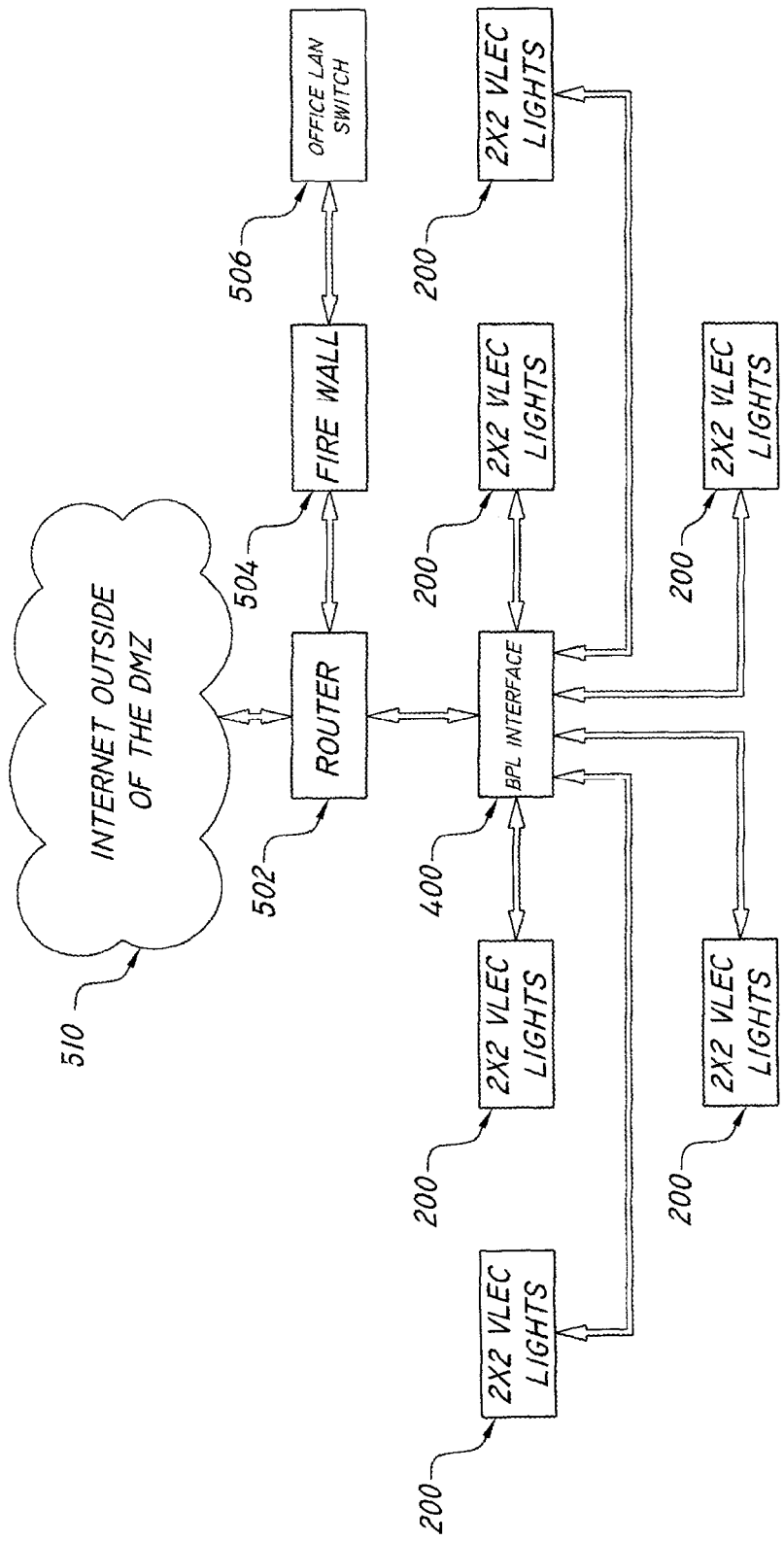
FIG. 16 illustrates by block diagram an electrical schematic of a BPL communications system including a plurality of hosts arranged in parallel in accord with an embodiment of the present invention.
Figure 17:
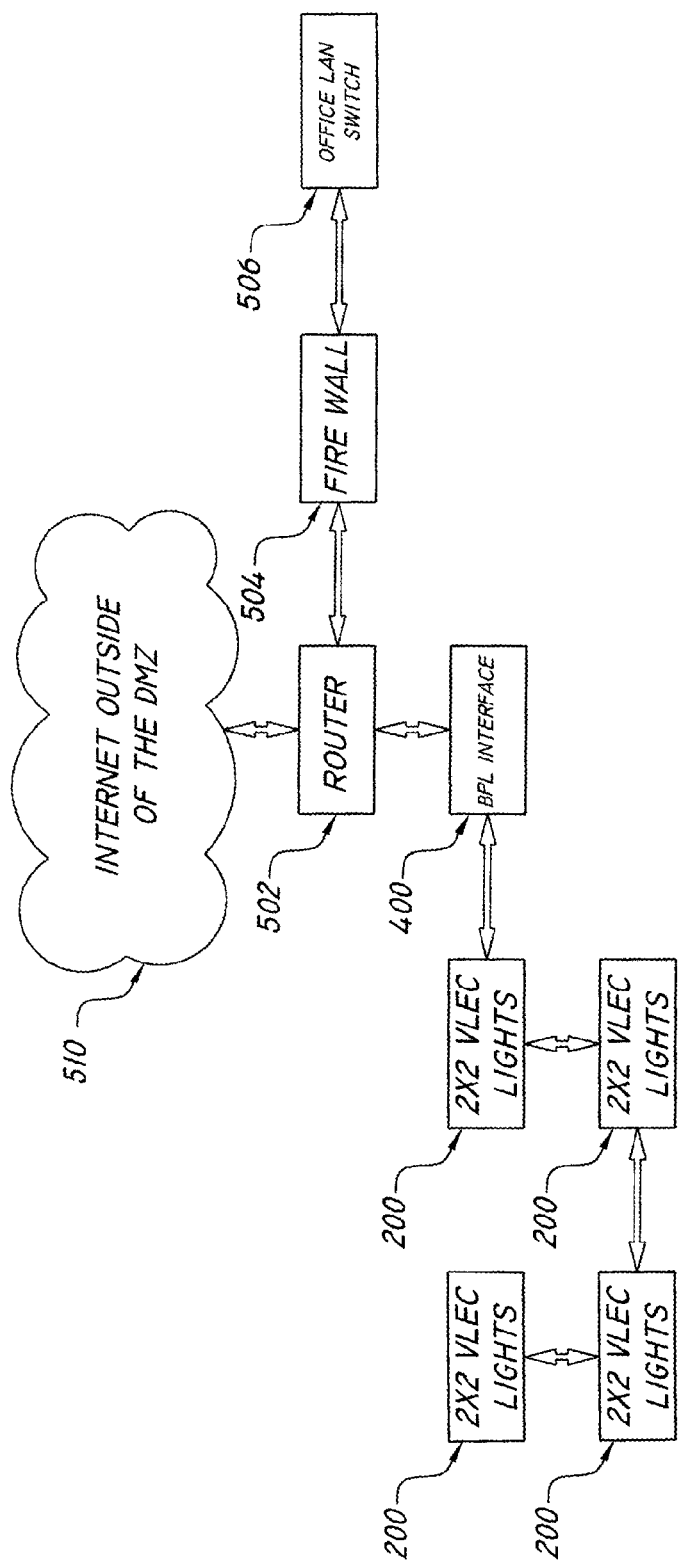
FIG. 17 illustrates by block diagram an electrical schematic of a BPL communications system including a plurality of hosts arranged serially and incorporating optical to optical transmissions in accord with an embodiment of the present invention.

FIG. 16 illustrates one possible configuration of network related components in combination with one possible configuration of VLEC related components. As illustrated therein, the Internet 499 may be accessed through a router 502, which might, for exemplary purposes, be coupled through a hardware or software firewall 504 to a standard office LAN and switch 507. While not illustrated, firewall 504 may also optionally be provided between router 502 and BPL interface 400. From BPL interface 400, a plurality of VLEC hosts 200 may be provided, each directly coupled to BPL interface 400. In contrast, FIG. 17 illustrates a plurality of VLEC hosts 200, only one which is directly wired to BPL interface 400, the remainder relying upon optical-to-optical communications between VLEC hosts 200. In other words, the present invention contemplates not only directly wiring each VLEC host 200 to BPL interface 400, but where desirable providing wireless VLEC communications between VLEC hosts 200, such that a communication from a client may pass through one or more optical-to-optical links before being coupled into a wired link.

In accord with one embodiment of the invention shown in FIG. 18 and similar to that illustrated and discussed with reference to FIG. 10, the wiring 410 between S-BPL interface 401 and LED light panels 200 is shielded by passing through a conduit 411 or the like and any appropriate junction boxes 412, defining a Shielded Broadband-over-Power-Line (S-BPL) connection that is both resistant to interfering communications and also produces almost no radiant energy.

Figure 18:
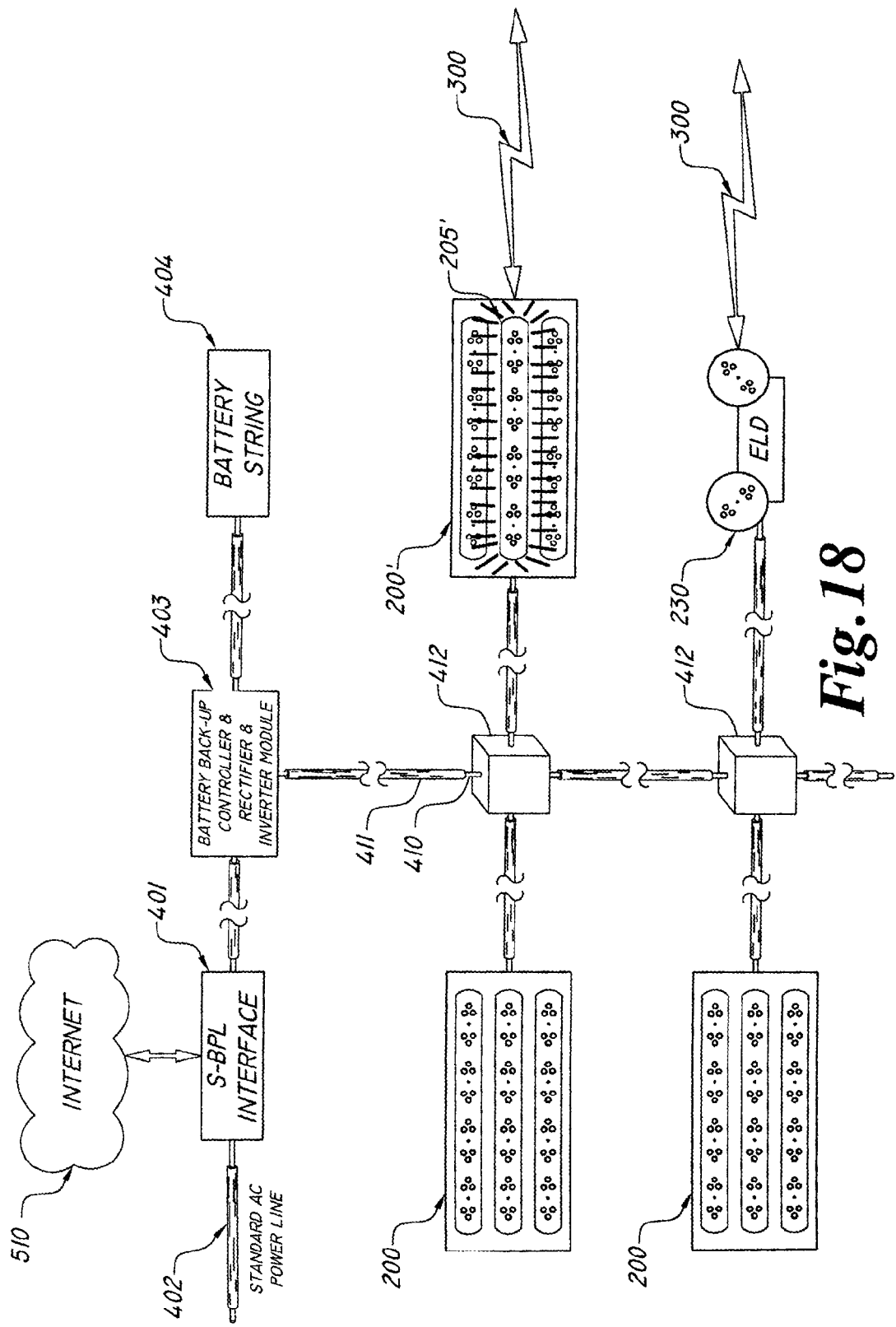
FIG. 18 illustrates by block diagram an electrical schematic of an S-BPL communications system including a plurality of hosts and further having an emergency illumination and embedded communications mode and apparatus in accord with an embodiment of the present invention.

In one embodiment as shown in FIG. 18 the VLEC system has the capacity to provide low power communications for energy management, emergency back-up, security and special applications utilizing alternative power sources such as batteries 404 or solar cells. Since each individual LED light panel 200 may be separately controlled, unnecessary lights may be extinguished in an emergency or during periods of nonuse. In some embodiments, the remaining lights may also or alternatively be used to maintain nominal communications channels within the building. The signals in such instance may be unable to be carried through power lines, and so may alternatively be implemented through an optical-to-optical repeater function from one light to the next such as described with reference to FIG. 17, to travel entirely through a chain of LED light panels 200. Additional Emergency Lighting Devices (ELD) 230 may also be controlled by a suitably designed battery back-up, controller, rectifier and inverter module 403.

While bandwidth may be relatively limited in the case of open wiring interspersed with other wires or adjacent to other sources of EMI/RFI, several additional circumstances may pre-exist or may be provided to boost the bandwidth of a system designed in accord with the present invention. In one embodiment, all or many BPL wires are shielded within a conduit 411 or other suitable shielding, most preferably for the entire distance between BPL interface 401 and each VLEC host such a LED light panels 200. Such shielding results in the preferred S-BPL communications channel, which is anticipated to have higher bandwidth capability than provided with open and unshielded wires.

Relatively recently, artisans have also proposed using so-called E-lines for extremely high bandwidth, low attenuation transmission. Such transmission schemes are, for exemplary purposes, proposed in U.S. Pat. Nos. 6,104,107 and 7,009,471, the entire contents of each being expressly incorporated herein by reference. While the present invention is fully operational using known or well-established transmission techniques and resulting bandwidths, and so is completely independent of whether these E-line transmission techniques work and are applicable or not to the present invention, the present invention further contemplates improvements to bandwidth using useful and functional transmission techniques and the incorporation of the same where operationally suitable.

Figure 19:
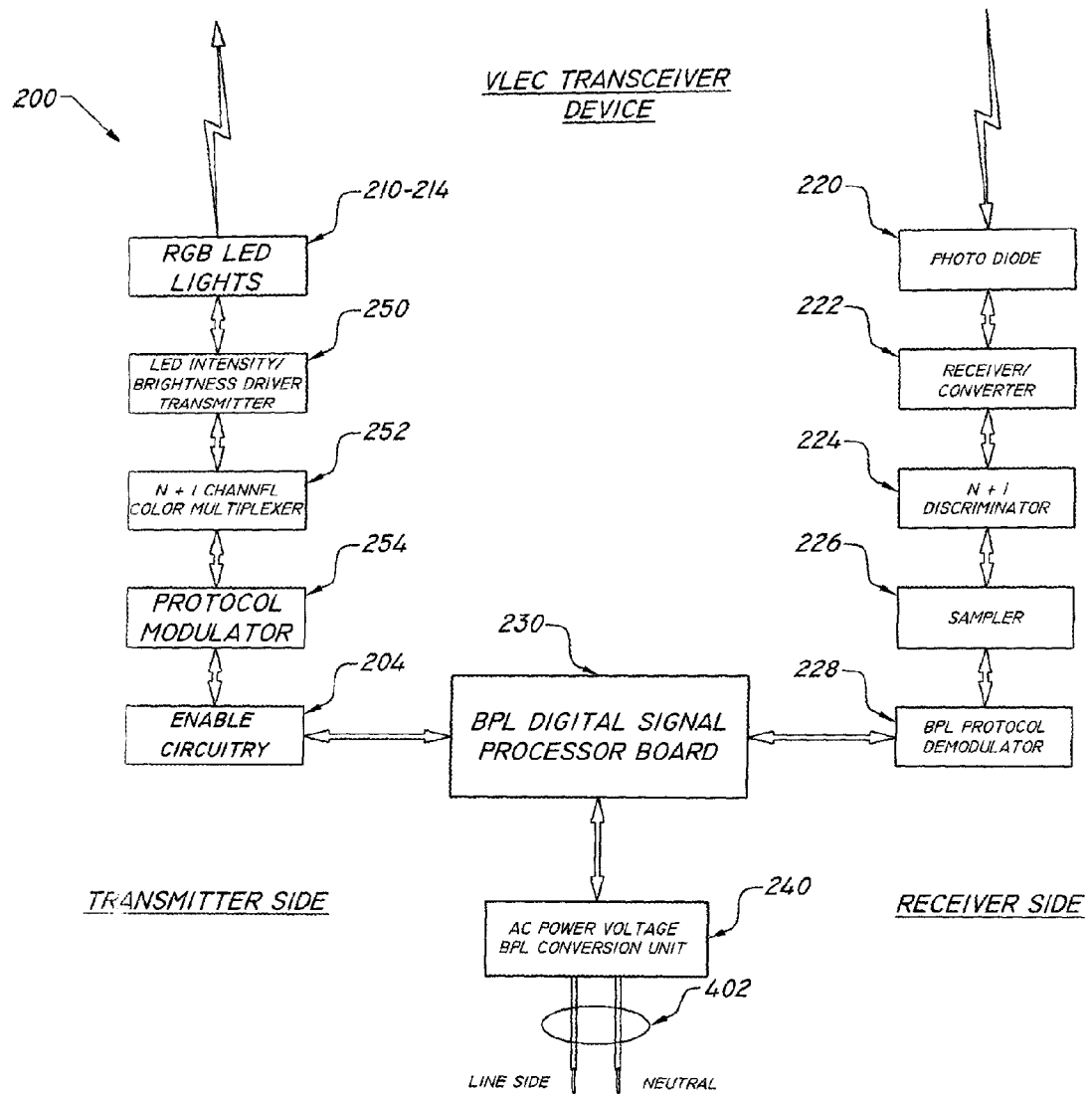
FIG. 19 illustrates by block diagram an electrical schematic of a VLEC transceiver in accord with an embodiment of the present invention.

FIG. 19 illustrates that a Visible Light Embedded Coded (VLEC) System features can include the responsibility for the validation of client devices by means of recognizing the client, then verifying the client against a small integrated relational look-up table. If the client device is foreign to the VLEC fixture, a verification request is then sent to a certified and redundant host core recognition service outside the network. This is similar to today's telecommunications networks. The client devices can be activated and de-activated by many forms. One such way involves 2 steps.

Step one is to power on the device. Step two is when the device must be authenticated and validated by the host look-up tables, which will provide permission levels depending on the requirements. The result of an unauthorized device will activate several processes. One, deactivate the client or host device. The second is to relay real-time location information about the device to the proper authorities.

An S-BPL transceiver 200 may be provided to receive and transmit data from/to the S-BPL enabled electrical circuit. The particular interface implemented may vary. Currently a number of existing interfaces could be used, such as Universal Serial Bus (USB), Ethernet, Media Independent Interface (MII), etc, and the particular choice of interface could further depend on the S-BPL transceiver used, as will be apparent to those skilled in the art.

A Digital Signal Processor or the like 231 is provided for program control that can transmit/receive data to/from BPL communication network 201 through transceiver 200. the Digital Signal Processor in an embodiment may respond to commands received on a network through S-BPL coupling 240 to manipulate enable circuitry 204, and may also issue commands or send data to network 201 if needed. If the transmit portion of enable circuitry 204 is enabled, these commands/data will also be passed to the optical link.

Enable circuitry 204, may in one embodiment be enabled to turn on or off the LED optical transmitter 250, as well as change the characteristics of the light, such as brightness and even color mix when multicolor LEDs are used. The Digital Signal Processor circuitry 231 may also manipulate the ability for BPL or any other medium transport known arts of communication network 201, to send and/or receive data to or from another adjacent optical link. This feature would provide the ability for the VLEC host to act as a client as well.

Driver circuitry 251 and LED(s) 210-214 will pass any signals to any optical link for other devices designed to communicate. Driver circuitry 251 may, in one embodiment, simply be appropriate buffering, isolation, modulation or amplification circuitry which will provide appropriate voltage and power to adequately drive LED emitter 210-214 into producing a visible light transmission. Exemplary of common driver circuits are operational amplifiers (Op-amps), transistor amplifiers and gates and NAND gates, though those skilled in the art of signal conditioning will recognize many of the optional circuits and components which might optionally be used in conjunction with the present invention. Also, it is desirable to use a modulation scheme with the signal so as to provide the intended design of duality as a general lighting fixture. The transmit circuitry may have to provide a means of modulation in this case, also preferably incorporated into driver circuitry 251. The type of modulation will be decided using known considerations at the time of design, selected for exemplary purposes from FM, AM, PPM, PDM, PWM, OFDM, and other derivatives of QAM schemes in the known arts.

Similar to but preferably complementary with the transmission circuitry, receiver circuitry 222 receives data from the optical link detected by photo sensor 220. Receiver circuitry 222 will appropriately amplify, and may further convert a data bearing electrical signal into Binary or Digital pulses. As but one example of such conversion, receiver circuitry 228 may additionally demodulate a data bearing electrical signal, if the data stream has been modulated by an optical host. A suitable sampling circuitry 226 and discriminator 224 will condition the data bearing electrical signal to yield appropriate and pre-determined information as a received data signal. The data bearing electrical signal is then demodulated by 223 and passed onto the DSP circuitry. From here the signal will contain protocol and payload packets that will propagate back onto the BPL Medium infrastructure via known art applications.

FIG. 20 illustrates a sample data packet 260 that might for exemplary purposes be used to communicate data through a preferred VLEC apparatus. Data packet 260 might include a CTS (Clear To Send) header 261, followed by validation 262. The main data content will be carried within payload 263, followed by a destination identifier 264, acknowledge 265, and packet verify 266.

FIGS. 21 and 22 illustrate different VLEC pulsing schemes 270 and 280, respectively, depending upon desired visible illumination levels. FIG. 21 illustrates a series of pulses 271-276 which, if averaged, are generally illuminating an LED through more time than not. The human eye produces a chemical process that averages the amount of light through time to provide descriptive visions interpreted by the brain.

With enough pulses of long enough duty cycle, the human eye will discern illumination. The level of illumination can be controlled by amplitude or duty cycle variations, as may be preferred, and preferably selected in such a way as to not interfere with a particular data modulation scheme.

In contrast to VLEC pulsing scheme 270, the ultra-low duty-cycle lighting communications pulsing scheme 280 of FIG. 22 intentionally reduces the duration of each pulse 281, 282 relative to the duration 283 between pulses. This in turn substantially reduces the duty-cycle, and can be used to dim or visibly extinguish an LED, while still providing communications through the LED. When extinguished, the duration of a pulse is shortened just enough to provide space for valuable information and the time between pulses are extended adequately to be undetectable by the human eye.

Ultra low duty cycle lighting technology can work positively by continuing to provide critical data to networks and people. With the appearance of being turned off, the lighting network can continue to communicate information. A second valuable trait is the very low energy consumption of this technology. This can be useful in a power outage, and so might preferably be implemented in combination with the apparatus of FIG. 18. The ability to communicate information in dark rooms is further beneficial as part of a energy conservation effort, since less energy is being used for illumination. Further, if the unauthorized person brings a portable illumination source such as a flashlight, optical detector 220 may detect the additional illumination and signal unauthorized presence.

While the foregoing discussions reference the illumination of a single LED or RGB LED, further contemplated herein is the separate control of a large number of LEDs. In such case, where full illumination is desired, several LEDs may be providing illumination, while a separate LED handles communications. Likewise, in the case of an ultra-low duty cycle demand, communications may be divided among a plurality of LEDs, thereby reducing the on-time percentage required within any individual LED, thereby permitting more data to be transferred without perceptibly increasing the illumination level from an individual LED.

As illustrated in FIG. 12, the present Visible Light Embedded Communications technology is applicable to a very large number of quite diverse applications. The present discussions are presented as more extensive, but purely exemplary illustrations of how VLEC may be applied in different situations and in different industries.

In the field of energy management, controlling lights, HVAC and the like in the past have not incorporated the use of VLEC technology. However, energy management is not solely limited to total power consumption. Peak inrush current is also an important factor monitored by many utility companies. This is the peak power draw of the power customer, for exemplary purposes within each twenty-four hour period. By controlling the timing of illumination and other equipment start-up, electrical draw may be gradually ramped up. Many devices initially draw more power at start-up than when operational. So, since each light is individually addressed and controlled and appliances or machines may similarly be controlled, the communications afforded by the present invention permit much smaller banks of devices to be started, allowing those devices to surge and then settle to lower energy requirements before starting the next bank of devices. Some devices and machines very quickly drop down to lower power draw. Even LED light panels 200 which serve as VLEC hosts are such a device. Banks of these may very quickly and sequentially be started. Other devices, such as electrical compressors found in heat pumps, refrigeration and air conditioning units, may require much more time for start-up, before additional devices should be started. Likewise, the particular order of start-up may be optimized for the various electrical loads found within a building. All of this is readily accomplished through simple programming and communication through preferred LED light panels 200 or equivalents thereto.

In other embodiments of the invention, numbers of occupants within a space may be used not only for anticipating illumination, but also to control operation of other appliances and machinery within the building. Exemplary of this, but not limited thereto, are water and space heaters and coolers, and all other electrical or electrically controllable devices.

When applying VLEC to tracking data as illustrated in FIG. 12, there exists a need to monitor assets throughout their journey. Intelligent tracking of client devices is applied by following a product, client device or asset through an infrastructure. An asset may be created and assigned a unique identifier only known by the manufacturer and the purchaser. The asset or entity will then be shipped to the purchaser and while in transit can be monitored by VLEC technology.

If audio and/or video is additionally enabled, either through communications badges 100 or separate wall-mounted devices, the video can be used to capture the last-known conditions of a user or an area. This can be important in the event a disaster strikes which results in significant destruction of property or life.

Using access or in-house BPL infrastructures, the present invention can utilize existing building wires to propagate information thus reducing or minimizing the need for costly capital upgrades. Consequently, many alterations or remodeling may simply be or result in relatively minor software revisions. With proper placement of suitable fixtures at the time of construction, no new illumination or communications wiring or fixtures will need to be provided, permitting extreme flexibility using primarily off-the-shelf components.

The embodiments illustrated herein are generally complimentary for indoor or outdoor use. In outdoor use, existing street lights and older incandescent traffic lights may be exchanged with modern LED lighting, enabling intelligent roadway systems using BPL or other information transportation mediums. Similar to indoor lighting designs, the street lights may provide an information infrastructure within themselves as the VLEC technology is incorporated into them, thus providing a private or secure form of information transfer. Existing metropolitan street lights are used to complete network design communications to the everyday intersection, thus alleviating the need for extensive fiber optic cables to achieve the same results. Information assignment may additionally be controlled to specific areas, unlike Radio Frequency communications. Massive bandwidths of information are available at every intersection, providing commercial, law enforcement and consumer needs and/or requirements. Moreover the cost for deployment is lower than alternative technologies, as the present invention is used for both information and providing areas of lighting at significantly reduced capital cost verses the return on investment. Core network infrastructures will be improved by using the VLEC technology and replacing huge amounts of cables on the back end of the IT control rooms.

Intelligent roadways may be constructed using LEDs and eventually incorporate the present VLEC technology. This will permit sufficient bandwidth to provide more precisely mapped road ways, and provide the foundation for improving traffic management by alerting drivers and emergency personnel of an accident or other traffic matter before they may come upon it. This information can then be transferred to the driver who would have the option of getting off at the nearest exit or begin slowing down the vehicle with a distance calculation device present in the vehicle and providing them with the exact location of the accident. The driver may even opt for the automated version of having their vehicle put into a safe driving mode and apply the brakes for them if they are within close proximity of the accident.

Parking lots and garages may additionally have VLEC host fixtures attached so that client devices that are attached or carried by some form can intelligently assist and remind a driver of the exact location of a vehicle. Illumination schemes may be provided to further assist in the identification that can range for exemplary purposes from specific colors showing a path to the vehicle, to selectively illuminating vehicle lights, to user name activation when the user is within the predesigned proximity of the vehicle.

Even with today's advances in Radio Frequency technology there still exist certain precautions in the medical field. Spurious RF emissions tend to interfere with sensitive medical equipment. Procedures involving Magnetic Resonance Imaging continue and X-ray practices would find valuable uses with this VLEC technology by alleviating bulky information cables. This would save on valuable floor space in today's hospitals facilities. The majority of medical field could utilize this VLEC technology by integrating with BPL technology. Hallways and areas of low population could have lights governed, and thus reduce annual operating expenses by employing this as an energy management solution. Medical equipment will be able to take full advantage of VLEC technology coupled with BPL infrastructures as this intelligence is integrated into the operational methods of the equipment.

Today's satellite navigated Global Positioning are augmented with the use of GPSRS. The burden on GPS satellites may be reduced by embedding unique identifier information and pre-documented exact location of an entity or asset. The unique GPSRS identifier may be incorporated into LED light fixtures or fixture controllers, switches, facility control units, facility servers, remote servers, power supplies, control units or any other electrical device which may be in a communication chain for communication of information, data packets, or commands or other types of communication or information transfer. This GPS-based location may then improve location-based services by providing real time location. Today's satellites update a location every 3 seconds. The information about the location of an entity or asset is always referenced back to a remote reference table. Current location measurements using satellites also require 3 or 4 satellites to improve the triangulation methods needed for locating a place or entity.

Location based services within a VLEC infrastructure will have the added advantage of improved and secure content. Personal Navigation devices will have the added advantage of providing improved coordination and collaboration methods by providing an increase in friend to friend location services. A friend to friend location services is an optional service whereby a personal list of friends or family members equipped with VLEC technology GPSRS devices can be created in a data base and that data base is managed by the group participants. When needed they utilize a VLEC GPSRS client device that associates with a VLEC host and then with a connection of some form through a controller in the home that connects or interfaces over BPL to the Internet. The information will then traverse the Internet and arrive at the predetermined location based on a designed collaboration (containing all Internet protocol addresses subnets and ports designed for this purpose) by the friends involved to create this network.

The controlling device will contain reference, relationship, awareness or look-up tables and establish in a millionth of a second, the location of the entity they are seeking. This information is then embedded or encapsulated into the data stream and transceived throughout the Internet. Today's cumbersome RF calculations require algorithmic math computations that are constantly changing and therefore reduce the accuracy of locating the device in real-time. A reference back to the previous or last known location require constant updates. Couple this with the inherent latency's of today's devices and effectiveness is reduced. Based on RF applications, there may be a need to measure the RSSI (radio signal strength indicator) and relate this information to another calculation table before we can apply probable table coordinates in order to perform a triangulation calculation of the client device. The RF Location based services rely heavily on assisted GPS technology. This technology is very taxing and expensive on computers, and contributes to a poor economy of scale approach for businesses. GPSRS will embed location information.

As may now be apparent, ultra high throughput at the last mile device is attained by VLEC augmenting methods that will prove more cost effective than any other solution available today. The present invention expands areas of network access to include a more vertical growth in current mature technologies. VLEC coupled with BPL and Ultra Low Duty Cycle lighting will extend the often limiting capabilities of Ethernet, USB and Wifi. Ethernet's primary focus has applied to a network consisting of wires. USB has simplified network connectivity.

At any time, using computing or electronic devices such as PCs, hand held devices, laptops, cell phones, transceiver glasses etc., you may change the color and intensity of the light being generated by the LED's to meet the needs of any given space.

In at least one embodiment, a controller or control server or other electronic device will provide a means to control lighting apparatus of a facility while simultaneously enhancing and redefining security systems, facility operational systems, security cameras and public address systems.

In some embodiments, visible light communication may reduce or eliminate the need for future or additional wiring within an existing or planned facility networks environment. Visible light communication may also augment existing networks.

Standard LED lights come in a variety of color temperatures, from 'warm' yellows to 'cool' whites. In facilities such as hospitals and offices, color temperature may significantly affect mood and productivity, where making a long-term commitment to a color temperature when converting to LED lighting may be a strong barrier to entry into LED lighting. In at least one embodiment, the LED's within the VLEC system have adjustable color temperature. In some embodiments, the VLEC LED light fixtures may be programmed to mimic the changing color temperate of sunlight as the day progresses.

In some embodiments, the solid state characteristics of LEDs allow enhanced control of energy consumption and light output through automated computer systems. For example, LED lights may be dimmed to provide additional energy savings. Fluorescent lights, by comparison, are not only difficult to dim, but the process of dimming can shorten the life of a fluorescent bulb. In a building incorporating a VLEC system, dimming may be controlled via synchronization with environmental stimuli to create a smart lighting environment which actively accounts for sunlight and saves energy by automatically dimming the LED lights within a VLEC light fixture when sunlight conditions allow.

In some embodiments, VLEC lighting systems may allow for further energy management for building owners as well as load management for power utilities. Power companies may have the ability to manage imperceptible reductions in lighting output across entire sections of a building, city block, or power grid. This feature would benefit the power utility and the customers, especially where peak energy consumption is high and energy demand outpaces infrastructural capacity.

Even in spaces not separated by physical objects, programmable signal response timing methods may create broadcast ranging in VLEC transmissions such that communication between a VLEC enabled apparatus may only occur at specified distances. In addition, because of higher achievable transmission rates, security will be further improved as more advanced encryption systems may be encoded into a VLEC wireless transmissions.

In some embodiments, the use BPL by the VLEC system may enable more advanced telecommunication and broadband services. For example, the hurdles of the "Last Mile" could potentially be avoided by transmitting data signals over a utility company's infrastructure in tandem with existing fiber optic network transport. Combined with the internal distribution of VLEC light fixtures throughout a building, the VLEC system may provide unlimited data hot spots without the latency caused by traditional physical limitations. Within a ubiquitous network environment using a VLEC system, customers may enjoy higher data speeds and security throughout an entire facility. In some embodiments, a VLEC system may be integrated with VoIP telephone services.

In some embodiments, a VLEC system may communicate data at a rate of 3 Mbps. In some embodiments, a VLEC system may reduce lighting energy consumption in a commercial building by 50%-90%.

In at least one embodiment, the VLEC system provides at least two major services, communication and lighting, for one cost. The VLEC system provides networking capabilities as well as continued monitoring and maintenance of VLEC light fixtures and communication system where lighting maintenance and related operational costs are provided by the VLEC lighting fixture owners. In some embodiments, such operational costs include: electrical consumption; lamp replacement and disposal; ballast replacement; lens replacement and cleaning; costs associated with requisition and employee distractions or interruptions; paperwork for purchase and defective returns as well as paperwork and operational costs for shipping, receiving, and distribution.

In some embodiments, a VLEC system and VLEC light fixture will include a camera, microphone, speaker, and sensory equipment integration. Cameras and other integrated devices may be used as environment sensors, detecting human traffic or ambient light, such as sunlight. In some embodiments, the camera, microphone, speaker and/or sensory equipment may reduce lighting energy consumption when a room is unoccupied or when ambient light conditions allow for reduced indoor lighting intensity.

In some embodiments, the VLEC system may include facial recognition software (together with camera, microphone, and speaker technology) which may be incorporated into a VLEC light fixture, where intercom calls may be made directly to the VLEC light fixture under which a person is standing. The person being called will communicate back by simply speaking near the light fixture. Such a system could eliminate the need to broadcast messages to an entire facility to ensure that the person being paged is reached. In some embodiments, the VLEC system may include other biometric recognition software such as voice recognition software, retinal scanner software, finger print or other digit or palm recognition software to name a few.

In some embodiments, the VLEC system also provides IT Savings, Air Conditioning Savings, Wireless Security, Network Service Dependability, Environmental Stewardship, and Energy Mandate Compliances.

In some embodiments, a VLEC system is in communications with other systems, providing the ability to offload mobile data traffic onto fixed VLEC Network devices. In some embodiments, the VLEC system may also provide Voice over Internet Protocol (VoIP) services.

In some embodiments, the coupling of the VLEC system with a BPL network will provide integrated networks using BPL technology to enable the physical deployment of increased and enhanced security services, such as providing VLEC light fixtures enabled with surveillance technology.

In some embodiments, the VLEC system will incorporate an analog communication scheme (i.e. OFDM signaling) as well as integrated carrier signal technology. Further the VLEC system will incorporate global positioning system routing service (GPSrS) capabilities and remote access management for integration with utility companies. Further, every electrical component forming the VLEC system or communication with the VLEC system will incorporate a global positioning system routing service (GPSrS) identifier and GPSrS recognition capabilities and remote access management for integration with utility companies or other communication or data/information systems.

In some embodiments, the VLEC system may be enabled with BPL technology using external BPL modules which may be integral to a VLEC light fixture. In some embodiments, a VLEC light fixture will still be compatible with standard network wiring, integrated BPL technology will provide enhanced performance, simplified installation, and lower installation cost to the customer.

In some embodiments, remote access management (RAM) software will allow accurate monitoring and control of individual VLEC light fixtures from a centralized computing location within a VLEC system equipped building. With RAM VLEC light fixtures may be programmed to turn on/off during specific times of the day, increase/decrease in brightness or compensate for daylight hours. With these features, a building owner employing the VLEC system may more accurately monitor and manage energy lighting consumption in a building.

In some embodiments, VLEC light fixtures may be installed throughout an entire building space and offer comprehensive lighting and communication services based on a digital communication scheme. With this communication scheme, each VLEC light fixture may support networking and communication capabilities for one or more computing devices, such as laptop computers. If 12 VLEC light fixtures are installed in a room, then 12 laptops or other VLEC system enabled devices, such as networked printers or telephones, may access the VLEC system network using the VLEC light fixtures.

In some embodiments, the VLEC system will incorporate an analog communication scheme, such as an Orthogonal Frequency-Division Multiplexing (OFMD) enabled communication scheme. With OFDM technology, each VLEC light fixture will support several computing devices simultaneously, as each LED in an VLEC light fixture becomes its own, independent communication point, capable of transmitting hundreds of communication channels simultaneously. Therefore, each VLEC light fixture will be capable of supporting a virtually unlimited number of computing devices.

In addition, by tuning the components in BPL circuitry, the VLEC system may accommodate the conversion of OFDM signals into light signals with very limited hardware.

In some embodiments, VLEC light fixtures may communicate with a computing device in a line-of-sight configuration. With the integration of carrier signal technology, VLEC light fixtures may be capable of communicating using a non-line-of-sight configuration. Being under a VLEC light fixture will not be a prerequisite to communicating through the VLEC system network. In at least one embodiment, communication through the VLEC system will be possible using reflected or ambient LED light signals.

In at least one embodiment, a user of a VLEC system may remotely control the lighting and communication environment in a building through automated management features. For example, RAM controlled VLEC lighting will have the ability to actively respond to activity within a building, such as human traffic. With daylight harvesting, RAM may program VLEC light fixtures to automatically reduce lumen output when sunlight is present in a room.

In some embodiments, RAM will broaden the scope of VLEC system services to include other security and communication features, such as centralized visual surveillance incorporating security cameras installed on the VLEC light fixtures. Incorporating intercom and facial recognition into such a VLEC system may enhance security within a facility as well as providing intercom announcements directly to an individual within a VLEC system enabled environment.

In some embodiments, the VLEC system will incorporate GPSrS technology. Currently, Internet protocol (IP) security allows an individual to access infrastructural systems from anywhere in the world. In some embodiments, the VLEC system is incredibly secure requiring appropriate passwords or necessary equipment thereby preventing 'faking' identities and gaining unauthorized access to IP protected systems.

In some embodiments, the VLEC system enhances cyber security establishing electrical smart grids, which may be based on standard Internet protocol.

In some embodiments, the VLEC system with GPSrS technology may eliminate cyber-security concerns. With GPSrS technology, a VLEC network use is tied to physical locations instead of easily manipulated passwords. Every packet of information sent over a GPSrS enabled infrastructure is tagged with a GPSrS coordinate identified with the communication node (VLEC light fixtures or other GPSrS enabled network device) which may be used to access and support the network. In some embodiments, every packet of information sent over a GPSrS enabled infrastructure may also be tagged with a receipt and/or transmission time stamp by each respective communication node (VLEC light fixtures or other GPSrS enabled network device) which may be used to access and support the network. Data or information to be communicated within the VLEC system will be continually tagged and/or updated with GPSrS identifiers from transmitting and receiving locations within the VLEC system. Only those packets of information tagged with the correct coordinate location (and any intermediate location along with any other necessary passwords or identifying material) have access to the system. As such, an infrastructure control may only allow access from predetermined locations (using a predetermined VLEC light fixture or GPSrS enabled network device) such that the packets of information desiring access are coded with the appropriate GPSrS coordinates. In some embodiments, every VLEC light fixture may be operationally tied to a GPSrS location, and will not communicate if removed from its authorized location and installed elsewhere.

In some embodiments, as a packet of information travels from its source destination to its final destination, it is continually evaluated by each communication node (VLEC light fixture or other GPSrS enabled network device) through which it passes. Each communication node interrogates the packet of information to discover the packet's last known destinations and its intended final destination, and checks that information against its current location and intended subsequent location to determine if any discrepancies exist. In addition, each communication node interrogates the packet of information to discover the time of the transmission and/or receipt from the packet's last known destinations to verify or determine any timing or delay discrepancies exist during the communication or over the communication route. Each data packet is therefore subjected to continual and ongoing authentication by each communication node (VLEC light fixture or other GPSrS enabled network device) through which it passes. If no discrepancies are identified then the packet is tagged with unique information from the interrogating communication node and sent to the next node along its path, where it is again evaluated using the information from the previous node and those preceding it. If a discrepancy exists, the packet cannot proceed within the VLEC system. This procedure establishes security for the data packet in real time and real space.

In some embodiments, the provision of Remote Access Management, within a VLEC system may allow local power utilities to integrate with the VLEC system to create total grid management capabilities. With smart-grid technology enabled by VLEC system remote management features, a utility company can monitor and stabilize power consumption across one or more power grids. For example, during peak consumption, a utility company may remotely reduce lumen output across a grid by an imperceptible 2% or 3% for a short period of time.

The ability to stabilize electrical consumption is important to utility companies, which must build grid infrastructure (i.e. power lines, transformers, generating facilities, etc.) to accommodate peak consumption periods of a day. This peak infrastructure is expensive to build and not efficiently utilized during non-peak consumption hours (when electrical consumption across a grid is significantly decreased). Therefore, stabilizing consumption across a grid is valuable to utility companies reducing the need to build electrical infrastructure. Also, electrical consumption reductions realized when energy efficient VLEC lights are deployed reduces peak infrastructure need.

In some embodiments, the use of a VLEC system and/or network facilitates the monitoring of power consumption within a building, and control of power usage, further stabilizing power consumption across an electrical grid. For example, a VLEC system enabled building with controls integrated into its elevator system may balance intermittent elevator usage and subsequent power consumption with lighting or illumination output. In some embodiments, the VLEC system may recognize when an elevator is in use, and may simultaneously reduce lighting consumption across designated areas of a building by imperceptible quantities, but with the effect of balancing power consumption within the building. In a building with integrated HVAC systems, HVAC consumption may be used to balance power consumption.

In some embodiments, the reduction in lighting output, or power relocations among various pieces of equipment established through the use of the VLEC system, would be imperceptible to the unknowing individual, the ability to reallocate power and stabilize electrical consumption within a single building, throughout a full city block, or across an entire power grid would conserve electricity and reduce a utility company's need to build expensive peak infrastructure.

In at least one embodiment, an operating exchange is utilized in association with a pulsed light communication system, using LED pulsed light communication signals embedded within illumination generated from LED light fixtures. In some embodiments the operating exchange is incorporated into the infrastructure of a building or structure utilizing LED light fixtures and other operating systems. In some embodiments, an individual may speak any language or have any educational background or training, and the individual may be able to immediately and intuitively operate the operating exchange for LED pulsed light and communication system and building operative systems. In some embodiments, the operating exchange is not dependent on culture or gender training or knowledge of an individual.

In some embodiments, the operating exchange is used to control all of the LED light fixtures and operating parameters within a structure or building. In some embodiments, the operating exchange facilitates an individual's ease of use of LED light fixtures and other functions within a building. In some embodiments, the operating exchange may be incorporated into more or less than all of the LED light fixtures or operating systems for a building.

In some embodiments, a computer or webpage on a computer may include drawings, diagrams and/or blueprints of a structure, where the operating exchange permits an individual to manipulate operating systems and controls within a building through activation/deactivation or manipulation through the computer or webpage. In some embodiments, an individual may focus on a desired location on a drawing, diagram and/or blueprint in order to access a system control to toggle the system control to a desired setting. The desired location on the drawing, diagram, and/or blueprint may represent switches and/or controls for building systems. In some embodiments, the switches and/or controls may communicate feedback as to the current status of a system setting. In some embodiments, the drawings, diagrams and/or blueprints as included in a computer include markers/identifiers such as rectangles or other shapes which represent LED light fixtures or groups of LED light fixtures or other systems or system controls. In some embodiments, the computer may also include indicators as to operational performance such as the amount of electricity being used or the setting of a system such as operation at a maximum or high level, as opposed to operation at a low setting.

In at least one embodiment, the operating exchange includes indicators as to the setting and/or operational status of building systems or features such as LED light fixtures, or other building systems, such as a thermostat.

In at least one embodiment, the operating exchange includes indicators for LED light fixtures such as the color, or color setting, for LED's within the LED light fixtures. In some embodiments, the color of the LED's within the LED light fixtures may vary.

In some embodiments, each building including LED light fixtures may include a map of the location of each of the LED light fixtures where each LED light fixture includes a unique location identifier which may be GPSrS Global Positioning System Routing System information.

In some embodiments, each control element, switch, activation device, keypad, button, dial, photodetector, LED lighting element, a dongle or key device, sensor, monitor, or other devices used to establish communication within a pulsed light communication system may include a unique location identifier such as GPSrS. In some embodiments, not all of the control elements are required to include LED communication devices, and some control elements will be in direct communication with a control server via wires. In alternative embodiments, a control element may be wired, where the wire extends to an intermediate pulsed light communication hub. The intermediate pulsed light communication hub includes a unique location identifier, controller, photodetector(s) and LED's and is adapted to receive pulsed light communication signals and to process the received pulsed light communication signals into electrical signals to be passed over the wire to a particular control element to change the status of the control element.

In some embodiments, each LED light fixture, LED dongle or key device, and each control element includes a specific location identifier which may be similar to the GPSrS location address, or an alpha-numeric, or numeric identifier as assigned to the control element to precisely locate the control element relative to the map, diagram, drawings, image, model and/or blueprint of a structure as included within a facility control unit. In some embodiments, each LED light fixture, LED dongle or key device, and each control element includes processors, controllers, LED's, and photodetectors to be in communication with a pulsed light communication system to receive pulsed light signals and to generate pulsed light signals to communicate information as to the status of a LED light fixture, dongle or key or control element. In some embodiments, each control element of a building system, such as a lighting system, heating system, security system, monitoring system, metering system, recording system, speaker system, elevator system to name a few, either has an integral LED photodetector and/or controller and LED's for pulsed light communication (integral Charlie unit) or may be retro-fitted to include an LED communication device such as a dongle or key device to receive pulsed LED light communication signals from an LED light fixture, and to generate and communicate LED light signals for receipt by an LED light fixture to provide information in response to a status request.

In some embodiments, each control unit may include sensors, meters, controllers, processors, photodetectors, and LED's to receive and to generate pulsed light communication signals to a facility control unit. In some embodiments, each control unit may function to be electrically connected to, and in communication with, motors, devices, servo motors, solenoids, or other electronic devices which are used to alter the status of a building system or system element such as a door lock, a thermostat, a light switch, an elevator control, a speaker, a microphone, a monitor to name a few. It should be noted that the identified elements for the control elements, building systems, system elements, or other identifiers herein are not intended to be exhaustive, and should be interpreted as expansive and are not intended to be limiting as to the specific elements or types of elements as identified herein.

In some embodiments, the facility control unit and/or each control element includes a processor, or controller which includes a security protocol to restrict activation or a change of status until such time as a security protocol has been satisfied, which may be communicated directly through pulsed LED light communication signals, or through an intermediate pulsed LED light communication hub, or via an electrical signal passed over a wire.

In some embodiments, the processor/controller in communication with each control element receives control signals, activation signals, or change of status signals which were generated from a facility control unit, or other remotely located control server, or other system server. In some embodiments, the processor/controller is in communication with each control element which may generate a device or operational status signal to be received by a facility control unit, remotely located control server, or other system server. The device or operational status signal in some embodiments is generated and transmitted by pulsed LED light communication signals.

In other embodiments, functions such as microphones and speakers may be regulated as well as cellular telephones if equipped with a pulsed light communication interface such as a dongle or key device. In some embodiments, cellular telephones may be deactivated within a building through manipulation of the virtual cyber-building control items.

In at least one embodiment a facility control unit is in communication with the LED XCVR light fixtures within each facility, where the facility control unit aggregates all connections from LED light fixtures back through one or more power units or power unit controllers for communication to a control server through use of the internet. The control unit comprises a computer. The facility management unit includes a Web server and a website. The website allows an individual to control the LED lights or LED light fixtures and to monitor how much energy is being used. The website may also regulate at least one security authorization which may be logon criteria including passwords and user verifications or other desired security measures. Following logon an individual through the control unit or facility controller may control the lights or electrical systems of a facility. An individual may use the website to issue commands to the individual power units in order to activate or deactivate electrical systems, LED lights or LED light fixtures, or to change the intensity or the color or the timing of the LED lights or LED light fixtures, to be on or off in a preset schedule or on an as needed basis.

In at least one embodiment the website includes a user interface that allows an individual to control the LED lights or LED light fixtures or to activate the light switches on the wall at specific desired locations or to activate other building systems. In one embodiment a wire may be run to specific locations within a facility where the ends of the wire include sensors to sense the current status or setting of an LED light, LED light switch, or status of a building function such as a light, thermostat, door, elevator, lock, camera, speaker, microphone or any other type of feature which may be sensed, manipulated or monitored. The sensed status is displayed on the website for the facility. The facility control website may include a touchscreen to monitor and to manipulate switches or to alter the status of a facility feature. The facility control website facilities the selection of one or more, or all, of the features to control, and via the website, screens regulate the functions of the facility through the website interface. In certain embodiments an individual may control all lights simultaneously for both warm and cool light settings, or settings in between warm or cool, or an individual may control the warm or cool settings individually through the use of sliding features on a touchscreen, which may be used to change the intensity of the LED lights. The facility control unit may also include feature program presets. The facility control unit may also include image and/or sound recordings and/or camera. In at least one embodiment the control of the features and functions of a facility occur over communications transmitted as pulsed light communications from LED fixtures and photodetectors. In at least one embodiment, the facility control unit includes facial recognition software, voice recognition software or other types of recognition software to name a few.

The status of a particular feature or function may be communicated to the facility management unit or controller by pulsed light communication signals from LED's and controllers as integral to, or in communication with the features or functions under consideration. In alternative embodiments the sensor may be integral with or in communication with the feature or function under consideration and the feature or function may include LED's, photodetectors and controllers in order to communicate the sensed status of the feature or function directly to the facility controller through the use of pulsed light communication signals, or alternatively through one or more intermediate pulsed light communication locations or devices, without the use of wires integral to the sensors.

In some embodiments the facility website and facility control unit or controller may communicate detailed status information and/or settings for all of the connected lights, features, and/or functions of systems within a facility.

In some embodiments the control page of the website enables an individual to establish and to set up programs for control of features and/or functions or lights for an individual room, were specific lights over a cubicle or other area are controlled remotely by the facility website and facility control unit or controller.

In at least one embodiment, information as related to electrical usage may be measured, collected and/or calculated and stored in the memory of the facility control unit or controller. The facility control unit or controller may periodically communicate the measured, collected and/or calculated electrical usage to a control server which may be remotely located relative to the facility. The control server may process electrical usage and generate bills from a billing system.

An individual having the correct login, password and security information may access the facility webpage interface from any remote location where internet access is available, in order to regulate or control the functions or features of a facility. An individual may control the lights or other functions or features with the preset settings, or the individual may selectively set the lights, function, or feature so long as the individual has an internet connection, which may be provided by a dongle or key device including a photodetector and LED's for communication through pulsed light communication signals. In some embodiments, access to the facility webpage interface may occur through the use of a desktop computing device, a transportable or laptop computing device, a cellular telephone device, a tablet computing device or any other communication device providing communication over the internet.

In at least one embodiment the control server measures and/or calculates the photons of light used as illumination and as emitted in pulsed light communications, or the control server measures and/or calculates the data exchanged in association with the lumens generated through the provision of illumination and pulsed light communications. Lumens, photons and/or data transmitted by the LED's in association with the generation of illumination and pulsed light communications may be measured and identified in units of measurement such as data lumen hours or data lumen minutes.

In some embodiments a controller which may be a fixture controller is used in association with each individual LED light fixture and in other embodiments one or more facility controllers are engaged to any number of fixture controllers. Combinations of fixture controllers and facility controllers may be utilized in any structure and variations of configurations may be utilized dependent on installation requirements within existing structures, new construction, renovation, remodeling, and/or upgrading of elderly structures.

In some embodiments it is anticipated that one or more LED light fixture controllers and facility controllers may be utilized in electrically independent environments such as facilities which have an independent electrical source such as a wind turbine. In these situations the LED fixture controllers and facility controllers may independently calculate, or may be in communication with a control server to calculate lumen consumption, data lumen hours, and/or data lumen minutes or combinations thereof for billing directly to a data lumen hour consumer.

In one embodiment, light switches may be mounted in a wall and a wire may be run to sense pins on the power unit controller, enabling activation of a switch controlling the light panels. A touchscreen monitor may be in communication with the power unit and website.

Logging onto the website may establish access to a multi-facility management unit control page. The website interface shows all of the power units that are in a facility and all other light panels or other features of the facility or plurality of facilities. An individual may select which power units to control or an individual may select all of the power units for control. The website interface enables control of all the light simultaneously both warm light and cool light. Alternatively, control of the warm light or cool light may occur at individual light fixtures or other building features. Alternatively, an individual may activate LED light features to change light intensities.

In some embodiments, the fixture controller or facility controller may record how many watts of electricity are being used on each preset and the electrical usage such as 158 watts to generate light. The fixture or facility controller may provide a test mode which runs the lights through stages, where the lights cycle through warm light and cool light, off and back on, to confirm functionality. The website control interface enables control of each individual light panel or LED light emitting diode. The website may provide detail information for a power unit to provide information regarding the settings and status for all 16 of the possible connected light panels and usage of each light fixture or LED light emitting diode.

The fixture or facility controller, website, and/or interface enable the selection or customization of programs for individual areas or rooms or individual groups of lights or specific lights over a cubicle or other location. All of the information related to wattage used may be collected on the power unit controller. A server may be set up at a remote location that will retrieve power/wattage usage information from the power unit controller, and enter the information into one or more servers, where the information may be communicated to, and processed by, a billing system for generation of bills to users of the LED light fixtures for consumption for illumination, pulsed light communications.

Each of the panel lights may have a unit controller and photodetector which allows pulsed light communications with a client device. The client device, USB interface devices, may be attached to laptops or computers. The drivers for those devices may be installed on an electronic device such as a tablet, smart phone, computer or other electronic device with or without the use of an application, or laptop or through an Ethernet connection.

The LED light panels may be connected to a power unit through an Ethernet plug. The Pro FTM signals, called the data, may be communicated over the same lines that are providing power prior to transmission through pulsed light signals. Three modules may be provided which are used in decoding of information and/or communication signals. Decoding is occurring and overriding the power line radio wave signals, the OFTM signals, and is communicated back into an Ethernet standard computer format, which then is communicated through LED pulsed light communication signals.

A computer located at a remote location may receive/record the data generated in association with the regulation and use of the light panels. The computer may process any number of different transactions. Any data may be retrieved for generation through the website interface for transmission over a power line or through pulsed LED light communication signals via the LED/s or the USB device. LED pulsed light communication signals may also be transmitted out of the USB device for receipt by the Charlie unit integral to an LED light fixture for transmission to the facility controller and website. It should be noted that a control server may simultaneously receive and process data from any number of websites representative of any number of facilities or geographic areas each having any desired number of fixture controllers and/or LED lights or LED light fixtures.

In some embodiments, all of the usage information as far as the wattage used may be collected on the power unit controller.

In some embodiments, modules on the LED light fixture decode pulsed light communications information. In some embodiments, the LED light fixture receives OFTM signals and converts the signals into an Ethernet standard computer format which then may be injected down into a facility controller.

In some embodiments, the facility controller is in communication with, and transfers information and data to a control server which may be a mainframe computer which may be located at a remote location. One or more facility controllers may be utilized to access account specific information on site or to control communications, illumination or other functions within a facility.

In some embodiments, information may be retrieved at a facility controller such as accounts receivable, accounts payable, general ledger, and/or expenses for a desired period of time. In some embodiments, an accounting system may be run remotely and may be communicated through the LED pulsed light communications. In some embodiments, a room may include any number of LED light fixtures. Each LED light fixture may be operating the same, or have a different setting resulting in different operation. In at least one embodiment, the data lumen hours or minutes for each LED light fixture may be recorded or regulated independently with respect to any other LED light fixture. A composite amount of data lumen hours or minutes may be calculated from the independent LED light fixtures and communicated to a facility controller or a control server.

In at least one embodiment, two physical servers are provided as facility control servers or mainframe servers which are configured to be Identical for redundancy. In some embodiments, VHM (Virtual Host Machines) A and B are duplicate physical servers at a facility or remote location. Each VHM server has the VMware operating system, allowing for numerous VPS (Virtual Private Server) to reside on each VHM server. The VPSs on VHM-A are exactly duplicated on VHM-8 for redundancy.

In some embodiments, a VPS may use a CentOS operating system and run Apache Web services. The VPS may also include a database (currently MySQL). In some embodiments, the VPS is used for the web site that provides remote control of VLEC light systems.

In some embodiments, the VPS monitors the VLEC light systems.

In some embodiments, the VPS may be copied for use as a FMU or Facility Management Unit which may be used to monitor and to control a facility.

Figure 23:
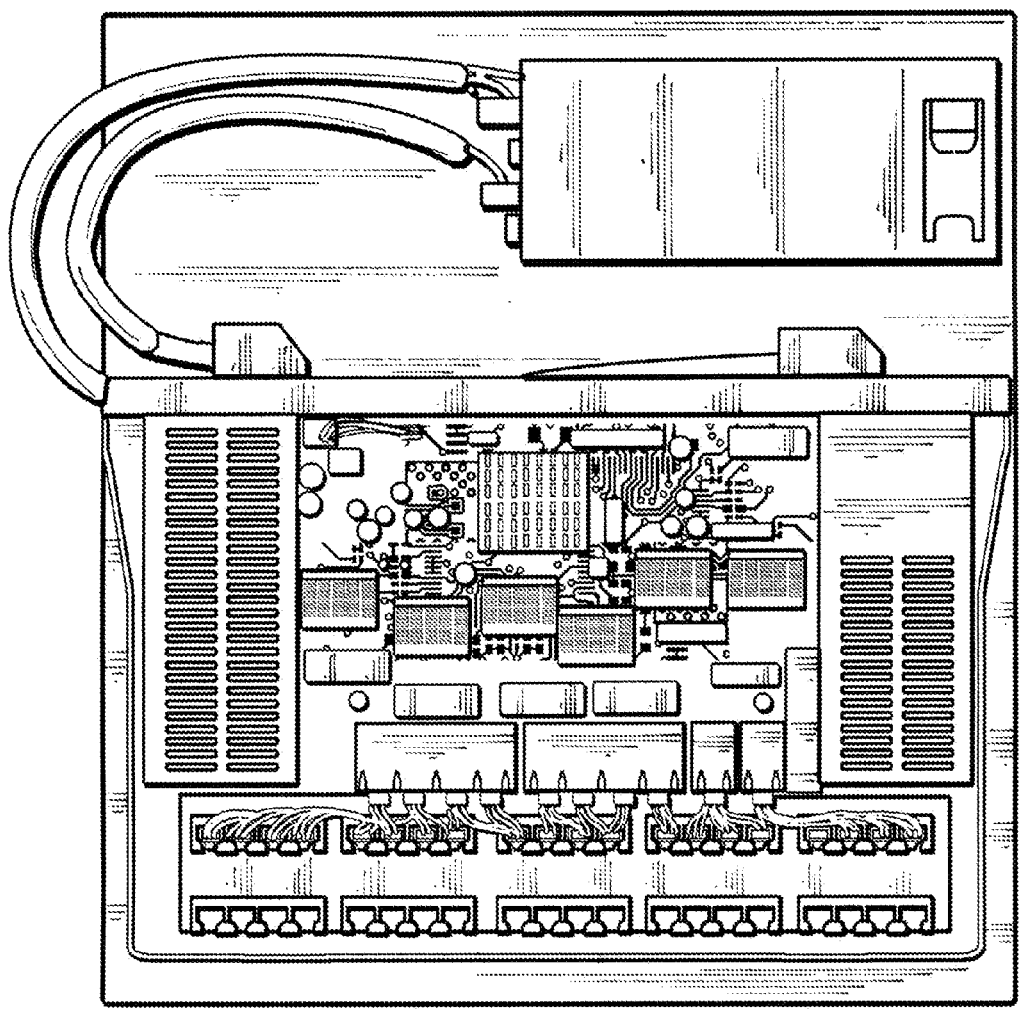
FIG. 23 illustrates an alternative embodiment of a power supply used with the invention.

In some embodiments, a power unit is used in association with a facility control unit. Each Power Unit may support 16 light fixtures. Power Units may be daisy-chained together. Each power unit may also accommodate hard wired wall switches, or touch panels for direct control of fixtures (FIG. 23).

In some embodiments, a Power Unit Controller (PUC) is located at a demarcation site, usually the datacenter of the facility, where an internet connection is available. If there will be more chains of Power Units connecting to the PUC than there are Ethernet ports available, then a switch may be placed between the PUC and the Power Units. The PUC controls DHCP functions for communications. It also controls and monitors the light fixtures by SNMP communication with the Power Units. The PUC accumulates usage data from the Power Units, which is periodically retrieved by the Monitoring Servers. The PUC contains a web server, with a web site for controlling and programming the VLEC light fixtures. This control web site will be available from any device that can display web pages {i.e. phones, tablets, computers, etc.}, provided the proper authorization is set up for a device or user. Current available network security and authorization techniques can be used to ensure access is limited appropriately.

The Monitoring Servers may be databases that accumulate usage statistics for all the PUCs, Power Units, and VLEC light fixtures. The monitoring services have an interface that allows operators to check the history and status of Infrastructural Apparatus. The monitoring servers may be configured to initiate alarms when there are issues with any hardware in the field, and/or network connectivity to that hardware. In some embodiments, the provider of the VLEC system is made aware of a problem immediately when it occurs, possibly even before the customer is aware. The monitoring servers will also perform the necessary calculations on the accumulated data to provide the appropriate billing information to the Billing System.

Enclosed herewith and incorporated by reference herein in their entireties are the following U.S. Pat. Nos. and patent application Ser. Nos.: U.S. Pat. Nos. 6,879,263; 7,046,160; 7,439,847; 7,902,978; 8,188,861; 8,188,878; 8,188,879; 8,330,599; 8,331,790; 8,543,505; 8,571,411; 8,593,299; Ser. Nos. 11/433,979; 12/032,908; 12/126,227; 12/126,342; 12/126,469; 12/126,647; 12/750,796; 13/427,358; 13/479,556; 13/706,864; 13/972,294; 14/033,014; 14/050,759; 14/050,765; 61/778,672; 61/783,501; 61/819,861; 61/867,731; 61/927,638; and 61/927,663.

This application is also related to the patent application entitled "Method of Measuring and Provision of Lumens," U.S. patent application Ser. No. 14/207,934 filed Mar. 13, 2014 which is incorporated by reference herein in its entirety. The present application is also related to the patent application entitled "LED Light Fixture," U.S. patent application Ser. No. 14/207,955 filed Mar. 13, 2014, issued as U.S. Pat. No. 9,100,124 on aug. 4, 2015, which is incorporated by reference herein in its entirety. Also the present application is related to the patent application entitled "Pulsed Light Communication Key," U.S. patent application Ser. No. 14/208,090 filed Mar. 13, 2014 which is incorporated by reference herein in its entirety.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

I claim:

1. An assembly and system comprising:
a. a plurality of light emitting diode light fixtures disposed throughout a facility, each of said light emitting diode light fixtures comprising a plurality of light emitting diodes and a unique light emitting diode light fixture identifier, said plurality of light emitting diodes generating illumination, said illumination comprising a plurality of flashes of illumination, said flashes of illumination not being observable to the unaided eyes of an individual;
b. a processor in communication with the at least one light emitting diode light fixture and said plurality of light emitting diodes, the processor being constructed and arranged to regulate said plurality of flashes of illumination into at least one pulsed light communication signal, said at least one pulsed light communication signal comprising said unique light emitting diode light fixture identifier;
c. at least one power unit constructed and arranged to provide power to said plurality of light emitting diode light fixtures; and
d. a control unit in communication with the plurality light emitting diode light fixtures, said control unit comprising a unique control unit identifier, said control unit being constructed and arranged to communicate at least one communication signal to said processor, said at least one communication signal comprising said unique light emitting diode light fixture identifier or said unique control unit identifier, said control unit further comprising a website, wherein said website permits an individual to control at least one of said light emitting diode light fixtures and to monitor energy being provided to at least one of said light emitting diode light fixtures, and further wherein said website functions as an interface to enable an individual to issue commands to at least one of said plurality of power units to change an amount of electricity provided to at least one of said plurality of light emitting diodes, or light emitting diode light fixtures.

2. The assembly and system according to claim 1 further comprising a plurality of sensors and switches in communication with at least one of said plurality of light emitting diode light fixtures, said sensors being constructed and arranged to sense the status of said plurality of light emitting diodes or said plurality of light emitting diode light fixtures, and to communicate said sensed status to said website for display on a display, said website further comprising a touchscreen said touchscreen being constructed and arranged to manipulate switches or to alter the status of at least one of said light emitting diodes or said light emitting diode light fixtures.

3. The assembly and system according to claim 1, said at least one power unit comprising a unique power unit identifier.

4. The assembly and system according to claim 3, said plurality of light emitting diode light fixtures being constructed and arranged to assign said unique light emitting diode light fixture identifier to a data packet.

5. The assembly and system according to claim 4, said control unit being constructed and arranged to assign said unique control unit identifier to said data packet.

6. The assembly and system according to claim 5, said power unit being constructed and arranged to assign said unique power unit identifier to said data packet.

7. The assembly and system according to claim 6, each unique power unit identifier comprising global positioning system routing information.

8. The assembly and system according to claim 5, said unique control unit identifier comprising global positioning system routing information.

9. The assembly and system according to claim 8, said control unit comprising a time assignment system, said time assignment system being constructed and arranged to assign at least one time to said data packet.

10. The assembly and system according to claim 9, said control unit comprising at least one data packet security system, said at least one data packet security system being constructed and arranged to verify said unique control unit identifier and said assigned time for said data packet.

11. The assembly and system according to claim 4, each unique light emitting diode light fixture identifier comprising global positioning system routing information.

12. The assembly and system according to claim 11, each of said plurality of light emitting diode light fixtures comprising a time assignment system, said time assignment system being constructed and arranged to assign at least one time to said data packet.

13. The assembly and system according to claim 12, each of said plurality of light emitting diode light fixtures comprising at least one data packet security system, said at least one data packet security system being constructed and arranged to verify said unique light emitting diode light fixture identifier and said assigned time for said data packet.

14. An assembly and system comprising:
a. a plurality of light emitting diode light fixtures disposed throughout a facility, each of said light emitting diode light fixtures comprising a plurality of light emitting diodes, each of said plurality of light emitting diode light fixtures further comprising a processor and a photodetector, said processor being in communication with said plurality of light emitting diodes, said plurality of light emitting diodes generating illumination, said illumination comprising a plurality of flashes of illumination, said flashes of illumination not being observable to the unaided eyes of an individual, said processor being constructed and arranged to regulate said plurality of flashes of illumination into at least one pulsed light communication signal;
b. a plurality of system control elements disposed throughout a structure each of said system control elements being in communication with a facility system, each of said system control elements comprising at least one light emitting diode and at least one photodetector, said at least one photodetector being constructed and arranged to receive said at least one pulsed light communication signal, said at least one pulsed light communication signal comprising at least one embedded pulsed light system control communication;
c. at least one power unit constructed and arranged to provide power to said plurality of light emitting diode light fixtures and said plurality of system control elements; and
d. a control unit in communication with the plurality light emitting diode light fixtures, said control unit comprising a processor and a website wherein said website permits an individual to alter the status of at least one of said system control elements.

* * * * *